(12) United States Patent
Behravan et al.

(10) Patent No.: US 10,271,343 B2
(45) Date of Patent: Apr. 23, 2019

(54) RESOURCE ALLOCATION FOR MOBILE TERMINAL CONFIGURED FOR DUAL CONNECTIVITY

(71) Applicant: Telefonaktiebolaget L M Ericsson (publ), Stockholm (SE)

(72) Inventors: Ali Behravan, Stockholm (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 14/910,936

(22) PCT Filed: Aug. 11, 2014

(86) PCT No.: PCT/SE2014/050930
§ 371 (c)(1),
(2) Date: Feb. 8, 2016

(87) PCT Pub. No.: WO2015/020605
PCT Pub. Date: Feb. 12, 2015

(65) Prior Publication Data
US 2016/0192379 A1    Jun. 30, 2016

Related U.S. Application Data

(60) Provisional application No. 61/863,959, filed on Aug. 9, 2013, provisional application No. 61/863,945, filed on Aug. 9, 2013.

(51) Int. Cl.
*H04W 36/00* (2009.01)
*H04W 72/10* (2009.01)
(Continued)

(52) U.S. Cl.
CPC ............. *H04W 72/10* (2013.01); *H04L 5/001* (2013.01); *H04L 5/0094* (2013.01);
(Continued)

(58) Field of Classification Search
None
See application file for complete search history.

(56) References Cited

U.S. PATENT DOCUMENTS

2005/0136938 A1* 6/2005 Kang .................... H04W 64/00
455/452.2
2010/0290369 A1* 11/2010 Hui ...................... H04B 7/2656
370/279

(Continued)

OTHER PUBLICATIONS

Intel corp "Dual connectivity for UEs supporting one UL CC" published Apr. 2013 all pages (Year: 2013).*

(Continued)

*Primary Examiner* — Brandon M Renner
(74) *Attorney, Agent, or Firm* — Murphy, Bilak & Homiller, PLLC

(57) ABSTRACT

Embodiments herein relate to a method performed by a first wireless network access point (12), for allocating uplink or downlink resources, to a mobile terminal (10) that is configured for dual connectivity wherein the mobile terminal (10) supports two or more contemporaneous links with two or more wireless network access points comprising the first wireless network access point (12) and a second wireless network access point (13). The first wireless network access point receives, from the second wireless network access point (13), resource allocation information for the mobile terminal (10) being in a dual connectivity mode. The first wireless network access point determines a resource allocation relating to the first wireless network access point (12) based on the received resource allocation information received from the second wireless network access point (13). The first wireless network access point sends, to the mobile terminal (10), a resource allocation message indicating the determined resource allocation relating to the first wireless network access point (12).

28 Claims, 18 Drawing Sheets

(51) Int. Cl.
*H04W 76/15* (2018.01)
*H04W 72/04* (2009.01)
*H04L 5/00* (2006.01)

(52) U.S. Cl.
CPC ....... *H04W 72/04* (2013.01); *H04W 72/0406* (2013.01); *H04W 72/0453* (2013.01); *H04W 76/15* (2018.02)

(56) References Cited

U.S. PATENT DOCUMENTS

| | | | | |
|---|---|---|---|---|
| 2012/0026976 | A1* | 2/2012 | Chang | H04L 5/001 370/331 |
| 2012/0069790 | A1* | 3/2012 | Chung | H04W 72/042 370/315 |
| 2013/0072116 | A1* | 3/2013 | Song | H04B 7/26 455/41.1 |
| 2013/0324143 | A1* | 12/2013 | Yokomakura | H04L 5/0005 455/452.1 |
| 2014/0036865 | A1* | 2/2014 | Camarda | H04L 5/0007 370/330 |
| 2015/0029996 | A1* | 1/2015 | Yuan | H04W 72/121 370/330 |
| 2015/0312811 | A1* | 10/2015 | Lei | H04W 36/38 370/331 |
| 2016/0066228 | A1* | 3/2016 | Fan | H04W 76/10 370/331 |
| 2016/0073394 | A1* | 3/2016 | Kim | H04J 11/0053 370/329 |
| 2016/0088609 | A1* | 3/2016 | Zhang | H04W 72/0413 370/329 |

OTHER PUBLICATIONS

Unknown, Author, "Summary of email discussion [81 bis#18][LTE/SCE-HL] CP protocol and architecture alternatives", Ericsson (Rapporteur), 3GPP TSG-RAN WG2 #82, Tdoc R2-131673, Fukuoka, Japan, May 20-24, 2017, 1-35.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 1-209.

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.3.0, Jun. 2013, 1-84.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, pp. 1-344.

Dahlman, Erik et al., "4G LTE/LTE-Advanced for Mobile Broadband—Chapter 10", Academic Press, Oxford, UK, 2011, 192.

Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.

Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, pp. 1-7.

Unknown, Author, "Necessity of C-plane architecture enhancements for dual connectivity", NTT DOCOMO, Inc., 3GPP TSG-RAN2# 81 bis, R2-131329, Chicago, USA, Apr. 15-19, 2013, 1-4.

Unknown, Author, "New work item proposal for Further Enhancements to LTE TDD for DL-UL Interference Management and Traffic Adaptation—Feature Part", 3GPP TSG-RAN Meeting #58, RP-121772, CATT, Barcelona, Spain, Dec. 4-7, 2012, 1-5.

Unknown, Author, "New work item proposal for Further Enhancements to LTE TDD for DL-UL Interference Management and Traffic Adaptation—Performance Part", 3GPP TSG-RAN Meeting #58, RP-121772, CATT, Barcelona, Spain, Dec. 4-7, 2012, 1-4.

Unknown, Author, "New work item proposal for Further Enhancements to LTE TDD for DL-UL Interference Management and Traffic Adaptation—Core Part", 3GPP TSG-RAN Meeting #58, RP-121772, Barcelona, Spain, Dec. 4-7, 2012, 1-6.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

Unknown, Author, "RRM related issues of Dual Connectivity technique", CATT, 3GPP TSG RAN WG2 Meeting #81 bis, R2-130978, Apr. 15-19, 2013, 1-4.

Unknown, Author, "The challenges of dual connectivity for single RX/TX capable UEs", Fujitsu, 3GPP TSG-RAN WG2 Meeting #82, R2-131856, Fukuoka, Japan, May 20-24, 2013, 1-5.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 1-176.

* cited by examiner

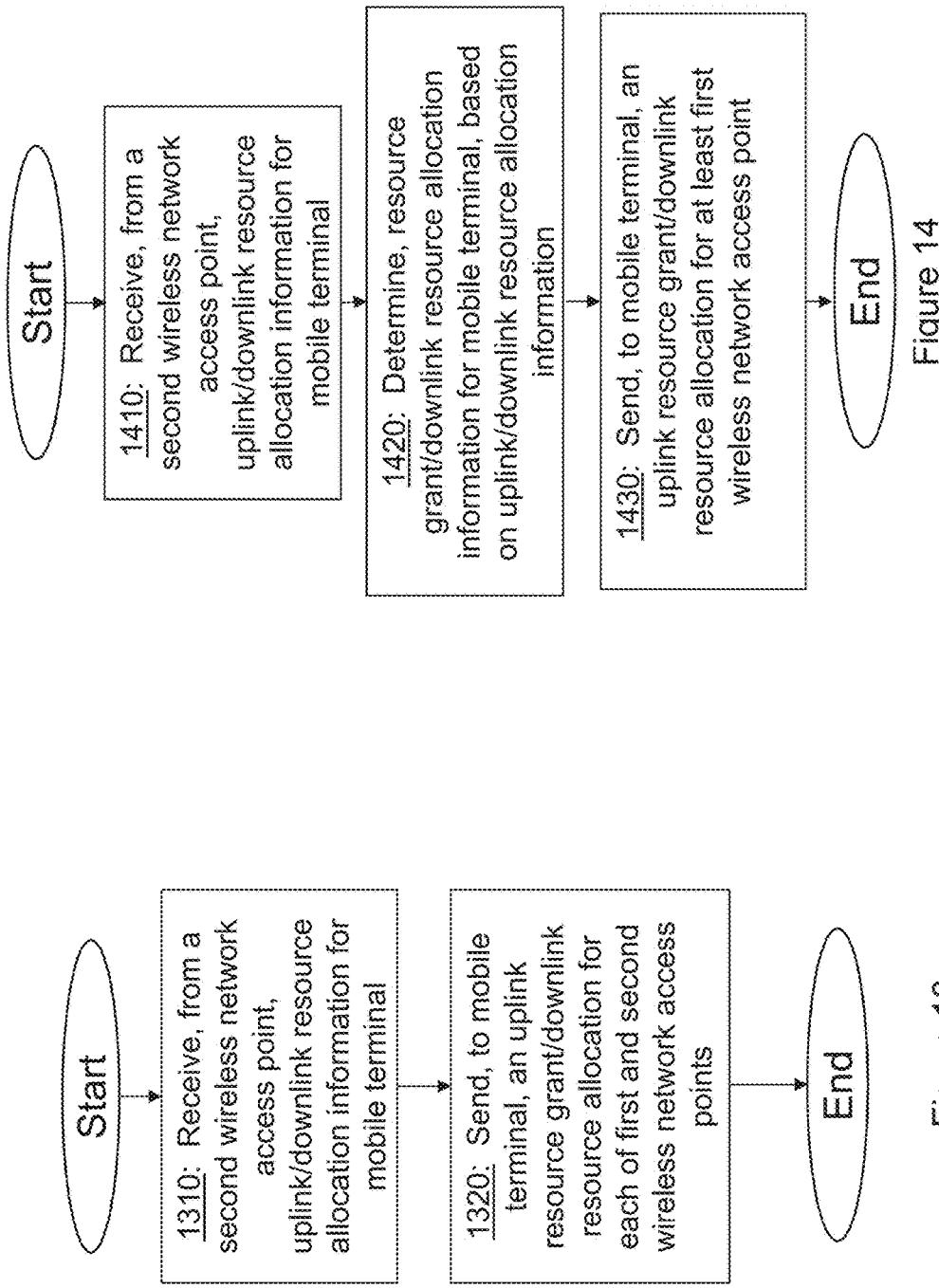

RESOURCE ALLOCATION FOR MOBILE TERMINAL CONFIGURED FOR DUAL CONNECTIVITY

TECHNICAL FIELD

The present disclosure is directed to wireless communications and, more particularly, to techniques for scheduling transmissions in dual-connectivity scenarios.

BACKGROUND

In a typical cellular radio system also referred to as wireless communication network, wireless terminals, also referred to as user equipment, UEs, mobile terminals, and/or mobile stations, communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station, also referred to as a base station, a RAN node, a "NodeB", and/or enhanced NodeB "eNodeB". A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, Wideband Code-Division Multiple Access (WCDMA), High-Speed Packet Access (HSPA), and Long Term Evolution (LTE) wireless technologies. Moreover, fueled by the introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired.

Techniques to improve downlink performance may include 4-branch Multiple Input Multiple Output (MIMO), multiflow communication, multi carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed for 3GPP as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GPP TSG RAN WG1 Meeting #70bis, San Diego, Calif., USA, 8-12 Oct. 2012; and R1-124513, Heterogeneous Network Deployment Scenarios, Ericsson, ST-Ericsson, 3GPP TSG-RAN WG1 #70bis, San Diego, Calif., USA, 8-12 Oct. 2012.

A homogeneous network is a network of base stations, also referred to as NodeB's, enhanced NodeB's, or eNBs, in a planned layout, providing communications services for a collection of mobile terminals in which all base stations may have similar transmit power levels, antenna patterns, receiver noise floors, and/or backhaul connectivity to the data network. Moreover, all base stations in a homogeneous network may offer unrestricted access to mobile terminals in the network, and each base station may serve roughly a same number of mobile terminals. Current cellular wireless communications systems in this category may include, for example, Global System for Mobile communication (GSM), WCDMA, High Speed Downlink Packet Access (HSDPA), LTE, Worldwide Interoperability for Microwave Access (WiMAX), etc.

In a heterogeneous network, low power base stations, also referred to as low power nodes (LPN), micro nodes, pico nodes, femto nodes, relay nodes, remote radio unit (RRU) nodes, small cells, RRUs, etc. may be deployed along with or as an overlay to planned and/or regularly placed macro base stations. A macro base station (MBS) may thus provide service over a relatively large macro cell area and each LPN may provide service for a respective relatively small LPN cell area within the relatively large macro cell area. Power transmitted by an LPN, e.g., 2 Watts, may be relatively small compared to power transmitted by a macro base station, e.g., 40 Watts for a typical MBS. An LPN may be deployed, for example, to reduce/eliminate a coverage hole(s) in the coverage provided by the MBS, and/or to off-load traffic from macro base stations, e.g., to increase capacity in a high traffic location, also referred to as a hot-spot. Due to the lower transmit power and smaller physical size, an LPN may offer greater flexibility for site acquisition.

In initial discussions among members of the $3^{rd}$-Generation Partnership Project (3GPP) regarding the development of Release 12 specifications for LTE, one of the proposed items for study is the possibility of simultaneously serving a mobile terminal from more than one eNB. In the disclosure that follows, this is called "dual connectivity." The control plane procedures of LTE have to be updated in order to support this dual connectivity.

Dual connectivity is a feature defined from the mobile terminal perspective, whereby the mobile terminal may simultaneously receive and transmit to at least two different network points. Dual connectivity is defined for the cases when the aggregated network points operate on the same frequency or on separate frequencies. Each network point that the mobile terminal is aggregating may define a stand-alone cell or it may not define a stand-alone cell. It is further foreseen that from the mobile terminal perspective, the mobile terminal may apply some form of Time Division Multiplexing (TDM) scheme between the different network points that the mobile terminal is aggregating in some scenarios, e.g. a scenario where the mobile terminal has less number of transmitter (TX) or receiver (RX) chains compared to the number of nodes it is connected to. This implies that the communication on the physical layer to and from the different aggregated network points may not be truly simultaneous in some scenarios. Thus, rather than purely simultaneous communications, dual connectivity may be regarded as providing support for contemporaneous communications with multiple independent network points, where "contemporaneous" should be understood as referring to events or things occurring or existing during the same period of time, where the periods of time relevant here are time periods relevant to wireless communications, i.e., on the scale of transmission time intervals, communications frame times, round-trip times, etc. The independence of the network points are understood as unrelated time sequences between nodes, e.g. unsynchronized subframe and frame time boundaries, etc.

Dual connectivity as a feature bears many similarities with carrier aggregation and coordinated multipoint (CoMP) communication, which are also technology areas undergoing rapid development in 3GPP and elsewhere. A main differentiating factor between dual connectivity and these other technologies is that dual connectivity does not require stringent synchronization between the wireless network access points and accommodates relaxed backhaul communication requirements. Besides, all the control plane processes, e.g. Automatic Repeat-reQuest (ARQ) signalling, radio link monitoring, signalling, etc. are completely independent with respect to the wireless network access points. For example, in dual connectivity mode, there will be one primary cell in both wireless network access points, thus the control plane will be terminated in separate wireless network access points. In this way, not only the data or user plane, the control plane is also independent in dual connectivity. This is in contrast to carrier aggregation and CoMP, where tight synchronization and a low-delay backhaul are assumed between connected network points. The mobile terminal in dual connectivity mode may in some cases not be able to communicate within the wireless communication network in an efficient manner using the resources allocated. This results in a reduced performance of the wireless communication network.

SUMMARY

An objective of embodiments herein is to provide a mechanism that improves performance of a wireless communication network employing dual connectivity in communications with mobile terminals.

According to embodiments herein the objective is achieved by providing a method, performed by a first wireless network access point, for allocating uplink or downlink resources, to a mobile terminal that is configured for dual connectivity, wherein the mobile terminal supports two or more contemporaneous links with two or more wireless network access points comprising the first wireless network access point and a second wireless network access point. The first wireless network access point receives, from the second wireless network access point, resource allocation information for the mobile terminal being in a dual connectivity mode. The first wireless network access point determines a resource allocation relating to the first wireless network access point based on the received resource allocation information received from the second wireless network access point. The first wireless network access point sends, to the mobile terminal, a resource allocation message indicating the determined resource allocation relating to the first wireless network access point.

In one example embodiment presented herein, the determined resource allocation relating to the first wireless network access point is an uplink resource grant for allocation of uplink resources relating to the first wireless network access point. The respective carrier frequencies used for the two or more contemporaneous links for uplink may be a same carrier frequency or different carrier frequencies.

In another example embodiment presented herein, a same carrier frequency is used for the two or more contemporaneous links for downlink and the determined resource allocation relating to the first wireless network access point is a downlink resource allocation for allocation of downlink resources relating to the first wireless network access point.

According to embodiments herein the objective is also achieved by providing a method performed by a mobile terminal for communicating data to or from the mobile terminal. The mobile terminal is configured for dual connectivity wherein the mobile terminal supports two or more contemporaneous links with two or more wireless network access points comprising a first wireless network access point and a second wireless network access point. The mobile terminal receives when being in a dual connectivity mode, from the first wireless network access point, respective uplink resource grants for allocation of uplink resources or respective downlink resource allocations for allocation of downlink resources relating to respective ones of the first wireless network access point and the second wireless network access point. The mobile terminal transmits uplink data to the first wireless network access point and the second wireless network access point, contemporaneously while the wireless network access points are independent from each other, according to the received respective uplink resource grants; or receives downlink data from the first wireless network access point and the second wireless network access point, contemporaneously while the wireless network access points are independent from each other, according to the received respective downlink resource allocations.

The transmissions of uplink data are contemporaneous in that they occur during the same period of time relevant to wireless communications, e.g., on the scale of transmission time intervals, for example by being time multiplexed. Similarly, the receptions of downlink data are contemporaneous in that they occur during the same period of time relevant to wireless communications, e.g., on the scale of transmission time intervals, for example by being time multiplexed.

In order to perform the methods herein a first wireless network access point is provided for allocating uplink or downlink resources, to a mobile terminal, The mobile terminal is configured for dual connectivity, wherein the mobile terminal supports two or more contemporaneous links with two or more wireless network access points comprising the first wireless network access point and a second wireless network access point. The first wireless network access point is configured to receive, from the second wireless network access point, resource allocation information for the mobile terminal being in a dual connectivity mode. The first wireless network access point is further configured to determine a resource allocation relating to the first wireless network access point based on the received resource allocation information received from the second wireless network access point, and to send, to the mobile terminal, a resource allocation message indicating the determined resource allocation relating to the first wireless network access point.

In order to perform the methods herein also a mobile terminal is provided for communicating data to or from the mobile terminal. The mobile terminal is configured for dual connectivity wherein the mobile terminal supports two or more contemporaneous links with two or more wireless network access points comprising a first wireless network access point and a second wireless network access point. The mobile terminal is configured to receive, when being in a dual connectivity mode, from the first wireless network access point, respective uplink resource grants for allocation of uplink resources or respective downlink resource allocations for allocation of downlink resources relating to respective ones of the first wireless network access point and the second wireless network access point. The mobile terminal is further configured to transmit uplink data to the first wireless network access point and the second wireless network access point, contemporaneously while the wireless network access points are independent from each other, according to the received respective uplink resource grants, or receive downlink data from the first wireless network access point and the second wireless network access point, contemporaneously while the wireless network access points are independent from each other, according to the received respective downlink resource allocations.

By letting the first wireless network access point determine uplink resource grants/downlink resource allocations for the mobile terminal in dual connectivity mode based on the resource allocation information for the mobile terminal from the second wireless network access point, a more efficient use of resources of the wireless communication network is achieved as resource allocations are made in a coordinated manner so that collisions in resource allocations relating to the respective first and second wireless network access points are avoided, leading to an improved performance of the wireless communication network.

Several such techniques are disclosed herein, including methods for network nodes to cooperate and allocate resources in UL grants or DL allocations in a coordinated manner. In some embodiments, guidelines are provided to the mobile terminal in order to resolve the uplink grants or downlink allocations by the mobile terminal.

BRIEF DESCRIPTION OF THE DRAWINGS

FIG. 13 is a process flow diagram illustrating an example method according to some of the disclosed techniques.

FIG. 14 is a process flow diagram illustrating another example method according to some of the disclosed techniques.

DETAILED DESCRIPTION

Figure 1:
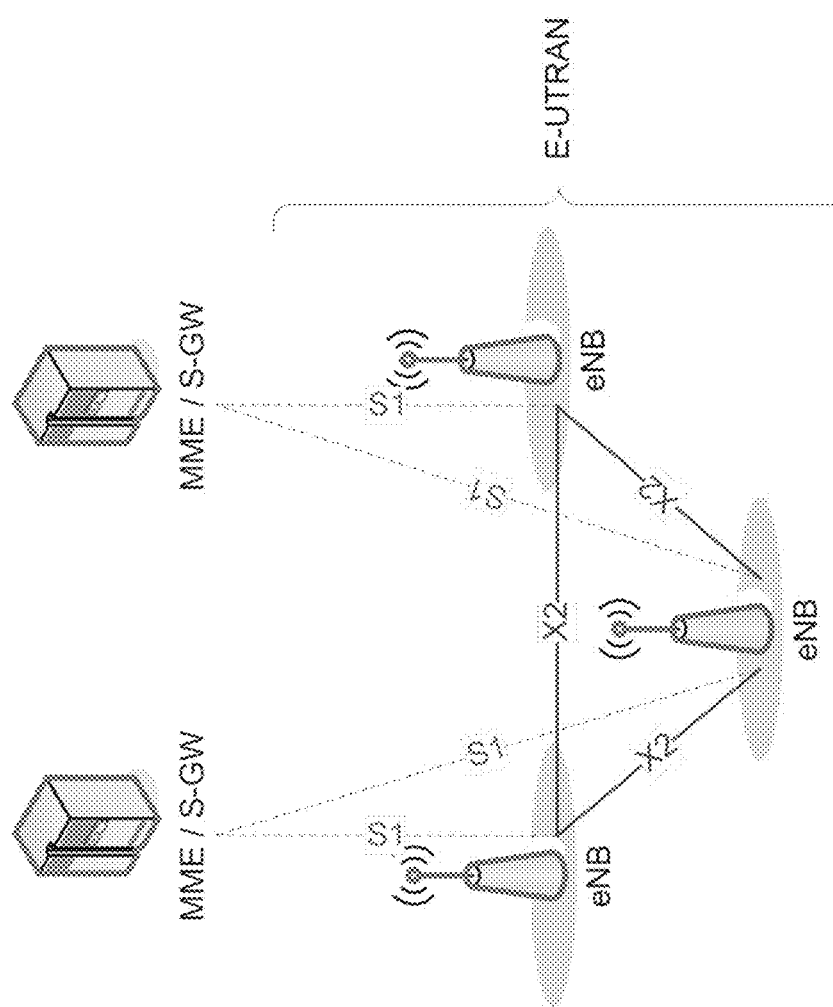
FIG. 1 is a schematic/block diagram illustrating the overall E-UTRAN architecture.

Embodiments herein will now be described more fully hereinafter with reference to the accompanying drawings, in which examples of embodiments are shown. Claimed solution may, however, be embodied in many different forms and should not be construed as limited to the embodiments set forth herein. Rather, these embodiments are provided so that this disclosure will be thorough and complete. It should also be noted that these embodiments are not mutually exclusive. Components from one embodiment may be tacitly assumed to be present or used in another embodiment.

For purposes of illustration and explanation only, these and other embodiments of present embodiments are described herein in the context of operating in a Radio Access Network (RAN) that communicates over radio communication channels with mobile terminals, also referred to as wireless terminals or User Equipments (UEs). It will be understood, however, that embodiments herein are not limited to such embodiments and may be embodied generally in any type of communication network. As used herein, a mobile terminal may include any device that receives data from a communication network, and may include, but is not limited to, a mobile telephone, "cellular" telephone, smart phone, laptop/portable computer, tablet, pocket computer, hand-held computer, desktop computer, a machine to machine (M2M) or Machine Type Communications (MTC) type device, a sensor with a wireless communication interface, etc.

In some embodiments of a RAN, several base stations may be connected, e.g., by landlines or radio channels, to a Radio Network Controller (RNC). The RNC, also sometimes termed a Base Station Controller (BSC), may supervise and coordinate various activities of the plural base stations connected thereto. The radio network controller may be connected to one or more core networks. According to some other embodiments of the RAN, base stations may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for mobile terminals.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The E-UTRAN comprises the Long Term Evolution (LTE) and System Architecture Evolution (SAE).

Note that although terminology from LTE is used in this disclosure to exemplify the embodiments herein, this should not be seen as limiting the scope of the embodiments to only these systems. Other wireless systems, including 3GPP WCDMA, Worldwide Interoperability for Microwave Access (WiMAX), Ultra Mobile Broadband (UMB), High- Speed Downlink Packet Access (HSDPA), GSM, etc., may also benefit from exploiting embodiments disclosed herein.

Also note that terminology such as base station, also referred to as NodeB, eNodeB, or Evolved Node B, and mobile terminal, also referred to as User Equipment node or UE, should be considering non-limiting and does not imply a certain hierarchical relation between the two. In general, a base station and a mobile terminal may each be considered an example of respective different communications devices that communicate with each other over a wireless radio channel. While embodiments discussed herein may focus on wireless transmissions in a downlink from a base station to a mobile terminal, or on wireless transmissions in an uplink from a mobile terminal to a base station, the embodiments may also be applied in the other direction, i.e. in an uplink or downlink, respectively. Furthermore, although the description below focuses, for purposes of illustration, on example embodiments in which described solutions are applied in heterogeneous networks that include a mix of relatively higher-power, e.g., "macro", base stations and relatively lower-power node, e.g., "pico", base stations, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as LTE, especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks as mentioned above where the traditional pre-planned macro base stations, known as the macro layer, are complemented with several low-powered base stations that may be deployed in a relatively unplanned manner. The 3GPP has incorporated the concept of Heterogeneous Networks as one of the core items of study in the latest enhancements of LTE, such as LTE release 11, and several low-powered base stations to realize heterogeneous networks such as pico base stations, femto base stations, also known as home base stations or HeNBs, relays, and remote radio heads (RRH) have been defined.

One of the proposed items for study in initial discussions for LTE release 12 is the possibility of serving a mobile terminal from more than one base station, simultaneously, or at least contemporaneously. The current legacy handover mechanisms of LTE may have to be updated to support this.

The E-UTRAN includes base stations called enhanced NodeBs (eNBs or eNodeBs), providing the E-UTRA user plane and control plane protocol terminations towards the mobile terminal. The base stations are interconnected with each other using the X2 interface. The base stations are also connected using the S1 interface to the Evolved Packet Core (EPC), more specifically to a Mobility Management Entity (MME) by means of the S1-MME interface and to a Serving Gateway (S-GW) by means of the S1-U interface. The S1 interface supports many-to-many relation between MMEs/S-GWs and base stations. The E-UTRAN architecture is illustrated in FIG. 1.

The base station hosts functionalities such as Radio Resource Management (RRM), radio bearer control, admission control, header compression of user plane data towards serving gateway, and/or routing of user plane data towards the S-GW. The MME is a control node that processes the signaling between the mobile terminal and the core network (CN). Significant functions of the MME are related to connection management and bearer management, which are handled via Non Access Stratum (NAS) protocols. The S-GW is an anchor point for mobile terminal mobility, and also includes other functionalities such as temporary down link (DL) data buffering while the mobile terminal is being paged, packet routing and forwarding to the right base station, and/or gathering of information for charging and lawful interception. The Packet Data Network (PDN) Gateway (P-GW) is the node responsible for mobile terminal Internet Protocol (IP) address allocation, as well as Quality of Service (QoS) enforcement, as further discussed below.

Figure 2:
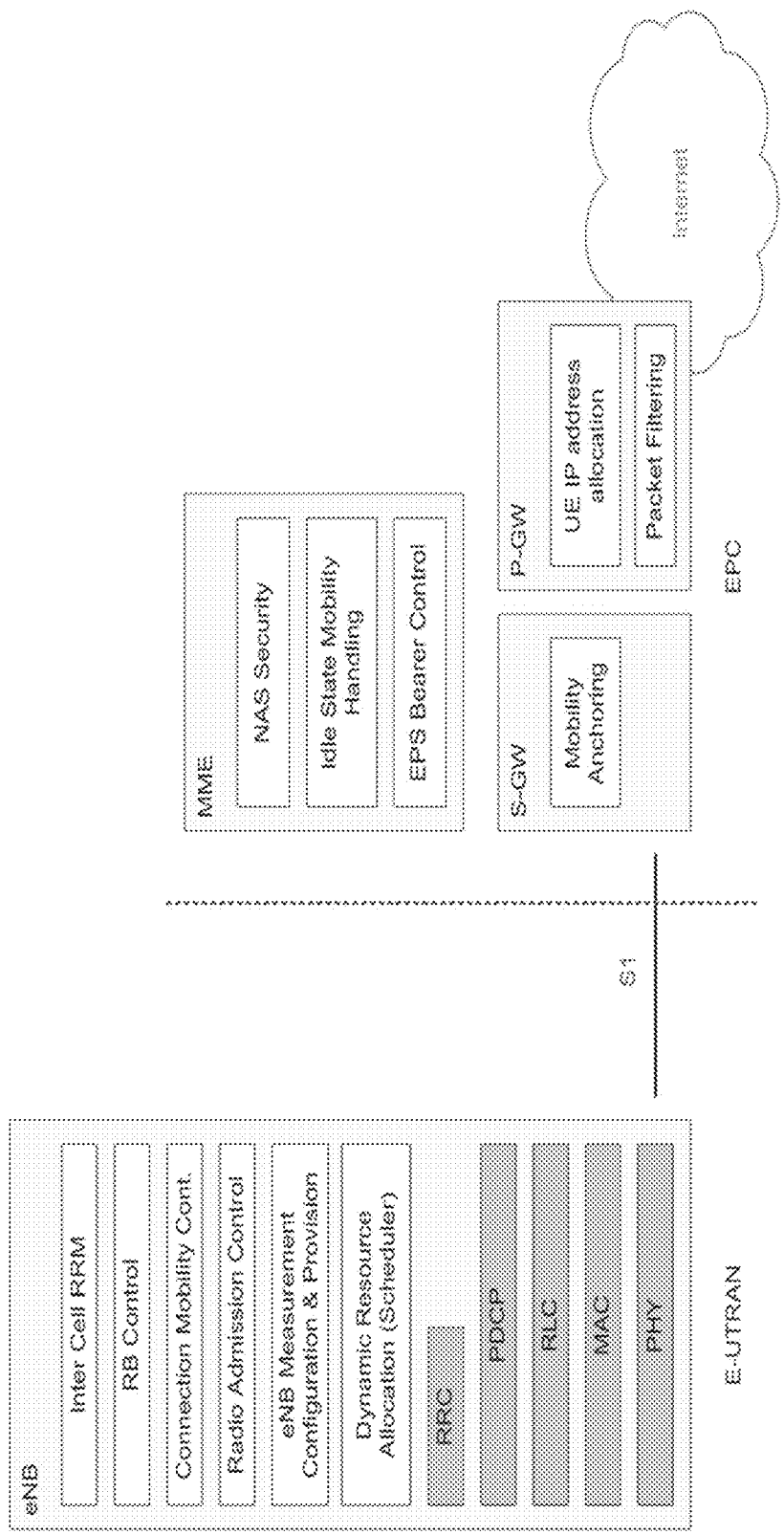
FIG. 2 is a block diagram illustrating a functional split between E-UTRAN and the Evolved Packet Core (EPC).

FIG. 2 illustrates a summary of functionalities of the different nodes, and the reader is referred to 3GPP TS 36.300 v. 11.6.0 and the references therein for further details of functionalities of the different nodes. In FIG. 2, blocks eNB, MME, S-GW, and P-GW illustrate logical nodes; blocks Inter Cell RRM, RB Control, Connection Mobility Control, Radio Admission Control, eNB Measurement Configuration & Provision, Dynamic Resource Allocation (Scheduler), NAS Security, Idle State Mobility Handling, Evolved Packet System (EPS) bearer Control, Mobility Anchoring, UE IP address allocation, and Packet Filtering illustrate functional entities of the control plane; and blocks Radio Resource Control (RRC), Packet Data Convergence Protocol (PDCP), Radio Link Control (RLC), Medium Access Control (MAC), and Physical (PHY) illustrate the radio protocol layers.

Heterogeneous Networks and Dual/Multiple Connectivity

Figure 3:
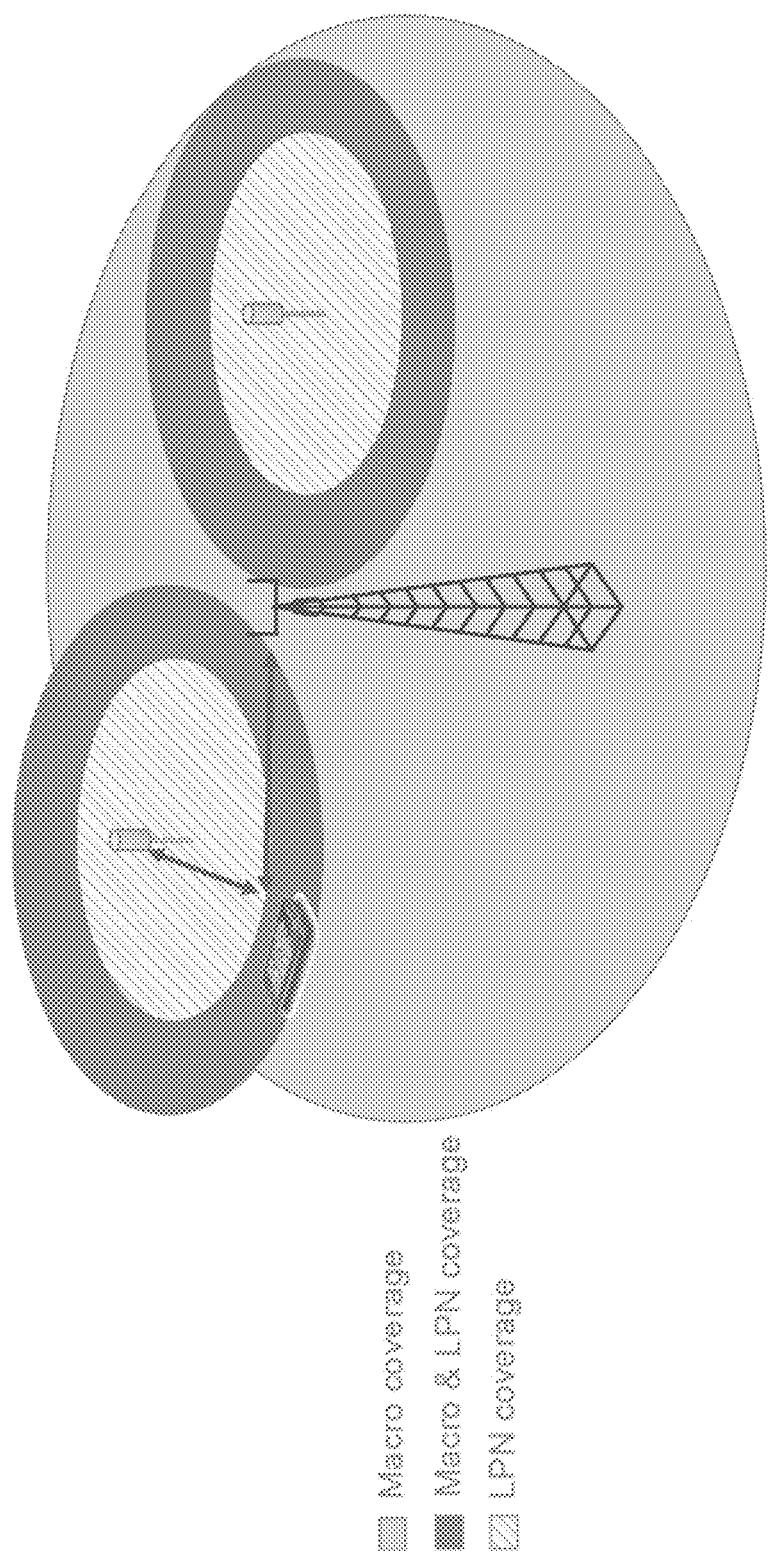
FIG. 3 is a schematic diagram illustrating a heterogeneous deployment with a higher-power macro node and lower-power pico nodes according to some embodiments.

A heterogeneous deployment or heterogeneous network, as illustrated in FIG. 3, includes network transmission nodes, e.g., micro and pico nodes or base stations, operating with different transmit powers and with overlapping coverage areas. A heterogeneous deployment/network is considered as an interesting deployment strategy for cellular networks. In such a deployment, the low-power nodes, "pico nodes", are typically assumed to offer high data rates (Mbit/s) and/or to provide increased/high capacity, users/m$^2$ or Mbit/s/m$^2$, in local areas, striped areas in figure, where increased data rates/capacity is/are needed/desired, while the high-power nodes, e.g. "macro nodes", are assumed to provide full-area coverage, grey area in figure. In practice, the macro nodes may correspond to currently deployed macro cells while the pico nodes are later-deployed nodes, provided to extend capacity and/or achievable data rates within the macro-cell coverage area where needed/desired. FIG. 3 illustrates a heterogeneous deployment with a higher-power macro node and two lower-power pico nodes, or "low-power nodes" (LPNs). In a typical case, there may be multiple LPNs within the coverage area of a macro node. Areas with both macro and pico coverage are dark grey in the figure.

Protocol Architecture Dual Connectivity

The term "dual connectivity" is used to refer to operation where the mobile terminal consumes radio resources provided by at least two different network points connected with non-ideal backhaul. Furthermore, each base station involved in dual connectivity for a mobile terminal may assume different roles. Those roles do not necessarily depend on the base station's power class and may vary among mobile terminals. As an example, one base station may have the role of a Master eNB (MeNB) and another base station may have the role of a Secondary eNB (SeNB) for a mobile terminal being in dual connectivity with the base stations. These roles of the base stations need not be the same for other mobile terminals connected to the base stations.

Figure 4:
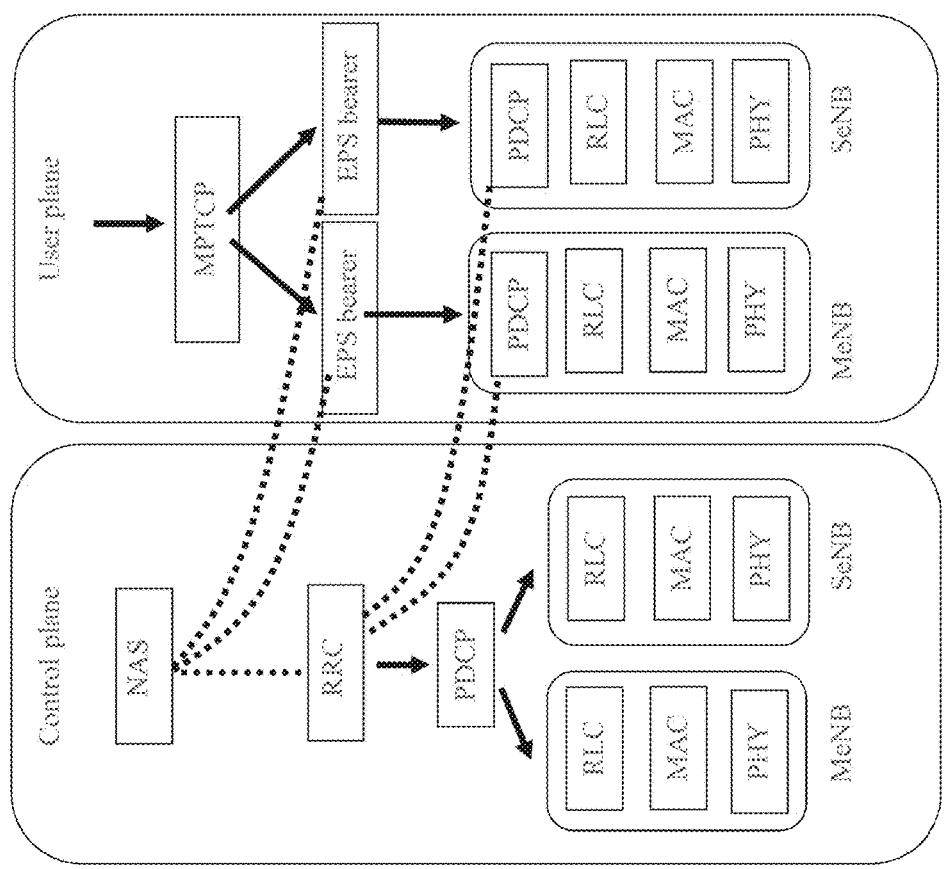
FIG. 4 illustrates an example protocol architecture for multiple connectivity.

To support multiple connectivity to low-power nodes (LPNs), several architectural options are possible both for the control and user planes. For the user plane, a centralized approach may be provided where the PDCP, or even the RLC, is terminated at an anchor node only and a booster node terminates at the RLC, or even the MAC, level. As an example, an anchor node can be a Master eNB or base station and a booster node may be a Secondary eNB or base station for any mobile terminal. A decentralized approach may be to have the booster to terminate at the PDCP level. A similar approach can be taken in the control plane, i.e., distributed or centralized PDCP/RLC, but on top of that the additional dimension of centralizing or distributing the RRC may be provided. FIG. 4 shows example control and user plane architectures where the user plane uses distributed PDCP, while the control plane is centralized at the PDCP level at the anchor node. Note that in FIG. 4, user plane aggregation, i.e., the possibility to split the packets belonging to one application data flow over the anchor and booster links, can be realized by using a higher layer aggregation protocol like multi-path Transmission Control Protocol (MTCP) with separate EPS bearers.

As part of developing embodiments herein a problem has first been identified. Uplink (UL) data transmission by the mobile terminal is based on UL grants provided by one or both networks. One problem that arises in a dual connectivity in same carrier or carrier frequency scenario is that a mobile terminal may be required to send uplink data to network nodes simultaneously at the same physical resource blocks. Accordingly, techniques are needed for managing the simultaneous uplink data transmissions on the same carrier or carrier frequency. Furthermore, another problem that arises in a dual connectivity scenario is that when downlink (DL) dual connectivity is operated in the same carrier or carrier frequency, a mobile terminal may be scheduled to receive data from two wireless network access points on the same resource blocks simultaneously. In that case, the mobile terminal will not be able to decode the transmitted data correctly, since the reception is done on the same resource blocks at the same time. Accordingly, techniques are also needed to ensure that DL allocations to a mobile terminal in a dual connectivity mode from multiple wireless network access points are always disjoint, when dual connectivity is employed in same carrier or carrier frequency.

Several such techniques are disclosed herein, including methods for network nodes to cooperate and allocate UL grants or DL resources in a coordinated manner. In some embodiments, guidelines are provided to the mobile terminal in order to resolve the uplink grants or downlink allocations by the mobile terminal. While the techniques detailed below are described as applied to only two simultaneous/contemporaneous links, it will be readily appreciated that the solutions are equally applicable and can be readily extended for terminals connected to more than two nodes.

In LTE systems, downlink scheduling grants are sent to the mobile terminal in the Physical Downlink Control Channel (PDCCH), using specification-defined Downlink Control Information (DCI) formats 1, 1A, 1B, 1C, 1D, 2, 2A, 2B and 2C. At the beginning of every downlink subframe, a UE monitors the PDCCH to determine whether it has any downlink resource allocation in that subframe.

Uplink scheduling grants are sent to the mobile terminal using DCI formats 0 or 4 in the PDCCH. A resource allocation in the uplink can be contiguous, single-cluster, or non-contiguous, multi-cluster, where LTE Release 10 allows up to two clusters on one component carrier. See Erik Dahlman et al., "4G, LTE/LTE-Advanced for Mobile Broadband," Academic Press, U K, 2011. Single-cluster allocations use uplink resource allocation type 0 and multi-cluster allocations uses uplink resource allocation type 1.

The message format for resource allocation type 0 contains a hopping flag bit followed by a field that points to the start of the allocation and another field containing the length of the allocation. In resource allocation type 1, the starting and ending positions of the two clusters of the resource blocks are encoded in an index.

In downlink (DL) dual connectivity, downlink data reception is based on the DL resource allocations that are provided by one or both wireless network access points in PDCCH. For any given subframe, it is possible that the DL resource allocations may be overlapping in the downlink, since the downlink resource allocations are determined independently, in different wireless network access points when dual connectivity is operated on the same frequency. Currently, there are no solutions available to ensure that such overlapping does not occur. Embodiments of the presently disclosed techniques address this problem.

In uplink (UL) dual connectivity, UL data transmission is based on the UL resource grants that are provided by one or both wireless network access points. For any given subframe, it is likely that the UL resource grants may be overlapping or that the UL resource grants are separated by certain frequency gaps so that intermodulation distortion appears. When UL grants are overlapping, then the mobile terminal is not able to transmit to two different wireless network access points on the same resource block simultaneously. Also, when the mobile terminal allocations are separated by certain frequency gaps, then intermodulation distortion appears which degrades the transmitter performance. So, in either case, the mobile terminal needs a solution for how to manage the simultaneous uplink data transmissions. Currently there are no solutions available for how to perform UL transmission based on two UL resource grants, and no techniques for resolving conflicts in scheduling grants.

Figure 5:
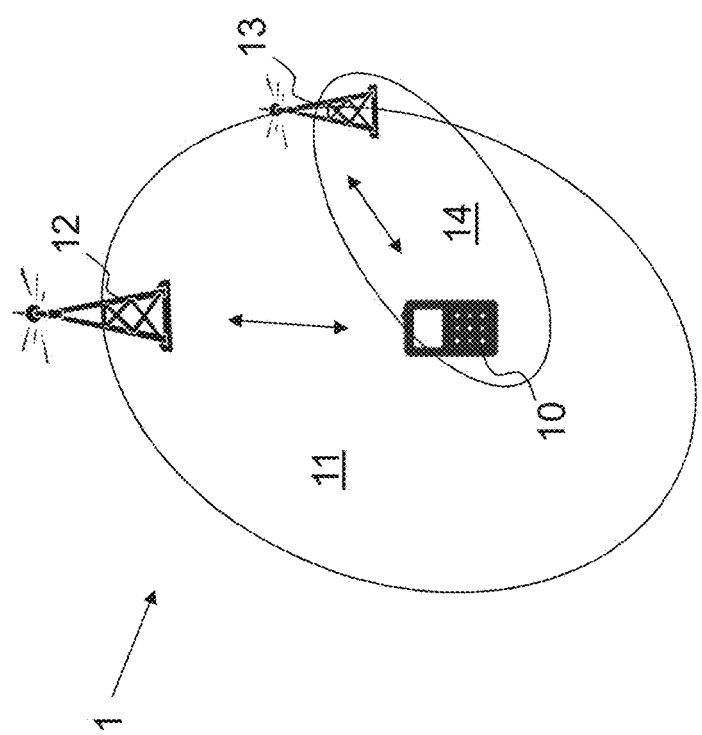
FIG. 5 illustrates a wireless communication network according to embodiments herein.

FIG. 5 is a schematic overview depicting a wireless communication network 1 according to embodiments herein. The wireless communication network 1 comprises one or more RANs and one or more CNs. In the wireless communication network 1, a mobile terminal 10, communicates via a Radio Access Network (RAN) to one or more core networks (CN). The wireless communication network 1 covers a geographical area which is divided into cell areas, e.g. a first cell 11 being served by a first base station being a first wireless network access point 12. The first wireless network access point 12 may serve one or more cells, such as the cell 11, and the first wireless network access point 12 may be a macro base station. Furthermore, a second wireless network access point 13 provides radio coverage over a second cell 14. The second wireless network access point 13 may be a pico base station. However, in an alternative embodiment, the second wireless network access point 13 may be a macro base station and the first wireless network access point 12 may be a pico base station. The wireless network access points may e.g. be base stations such as a NodeBs, an eNode Bs, base transceiver stations, Access Point Base Stations, base station routers, Wi-Fi access points, or any other network units capable of communicating with a mobile terminal within the cell served by the respective wireless network access point depending e.g. on the radio access technology and terminology used.

A cell is a geographical area where radio coverage is provided by radio base station equipment at a base station site or at remote locations by Remote Radio Units (RRU). The cell definition may also incorporate frequency bands and radio access technology used for transmissions, which means that two different cells may cover the same geographical area but using different frequency bands and/or different Radio Access Technologies (RATs). Each cell is identified by an identity within the local radio area, which is broadcast in the cell. Another identity identifying the cells uniquely in the whole wireless communication network 1 is also broadcasted in the cells.

The mobile terminal 10 is configured for dual connectivity wherein the mobile terminal 10 supports two or more contemporaneous links, comprising a first and a second link, with two or more wireless network access points comprising the first wireless network access point 12 and the second wireless network access point 13. According to embodiments herein the first wireless network access point 12 receives from the second wireless network access point 13, resource allocation information for the mobile terminal 10 being in dual connectivity mode. Dual connectivity mode means that the mobile terminal is configured to support dual connectivity either on a same carrier frequency applied for the two or more contemporaneous links comprising the first and second links where data (and/or control) transmitted on the first link is different from data (and/or control) transmitted on the second link OR on different carrier frequencies applied for at least two of the two or more contemporaneous links, for example the first and second links, where data and/or control sent on the at least two of the two or more contemporaneous links, for example the first and second links, is the same. The first wireless network access point 12 determines a resource allocation relating to, or controlled by, the first wireless network access point 12 based on the received resource allocation information received from the second wireless network access point 13. The first wireless network access point then sends, to the mobile terminal 10, a resource allocation message, shown in FIGS. 6-8, indicating the determined resource allocation relating to the first wireless network access point 12. The resource allocation may be an uplink resource grant for allocation of uplink resources or a downlink resource allocation for allocation of downlink resources. Uplink resource grants may also be referred to as uplink scheduling grants, and downlink resource allocations may be referred to as downlink scheduling allocations or downlink assignments.

An efficient use of resources of the wireless communication network is achieved in that the first wireless network access point 12 determines or manages uplink resource grants/downlink resource allocations for the mobile terminal 10 taking into account the resource allocation information for the mobile terminal 10 from the second wireless network access point 13. This leads to an improved performance of the wireless communication network 1.

Multiple Uplink Scheduling Grants or Downlink Scheduling Allocations for Mobile Terminals with Dual Connectivity Some embodiments of the present techniques comprise methods of configuring the mobile terminal 10 to receive multiple uplink scheduling grants or downlink scheduling allocations in a dual connectivity mode. The different uplink scheduling grants or downlink scheduling allocations can be sent from one of the nodes, i.e. wireless network access points, or the different uplink scheduling grants or downlink scheduling allocations may be sent from different nodes. Alternatively, all uplink scheduling grants or downlink scheduling allocations may be sent from all network nodes, to improve the reliability by means of diversity. It should be understood that the uplink scheduling grants may be referred to as uplink resource grants and the downlink scheduling allocations may be referred to as downlink resource allocations.

Figure 6:
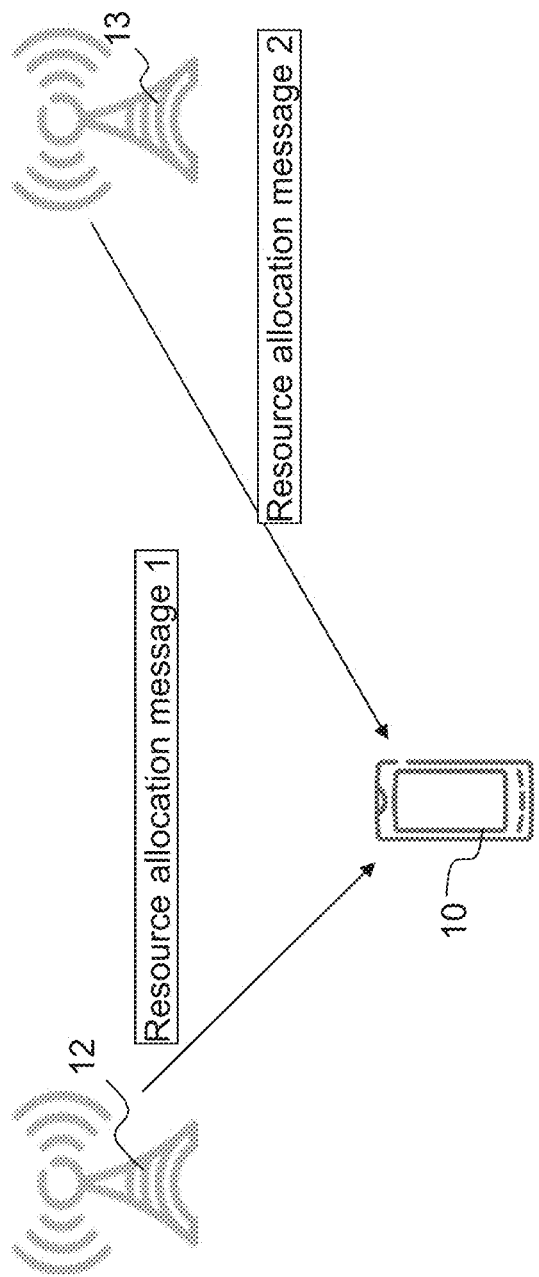
FIG. 6 illustrates the sending of different resource allocations from different network nodes.

In the case of transmission of different scheduling grants/allocations from each network node, the resource allocation message transmission is similar to legacy case. This is shown in FIG. 6, where different resource scheduling grants/allocations are sent from different wireless network access points.

Figure 7:
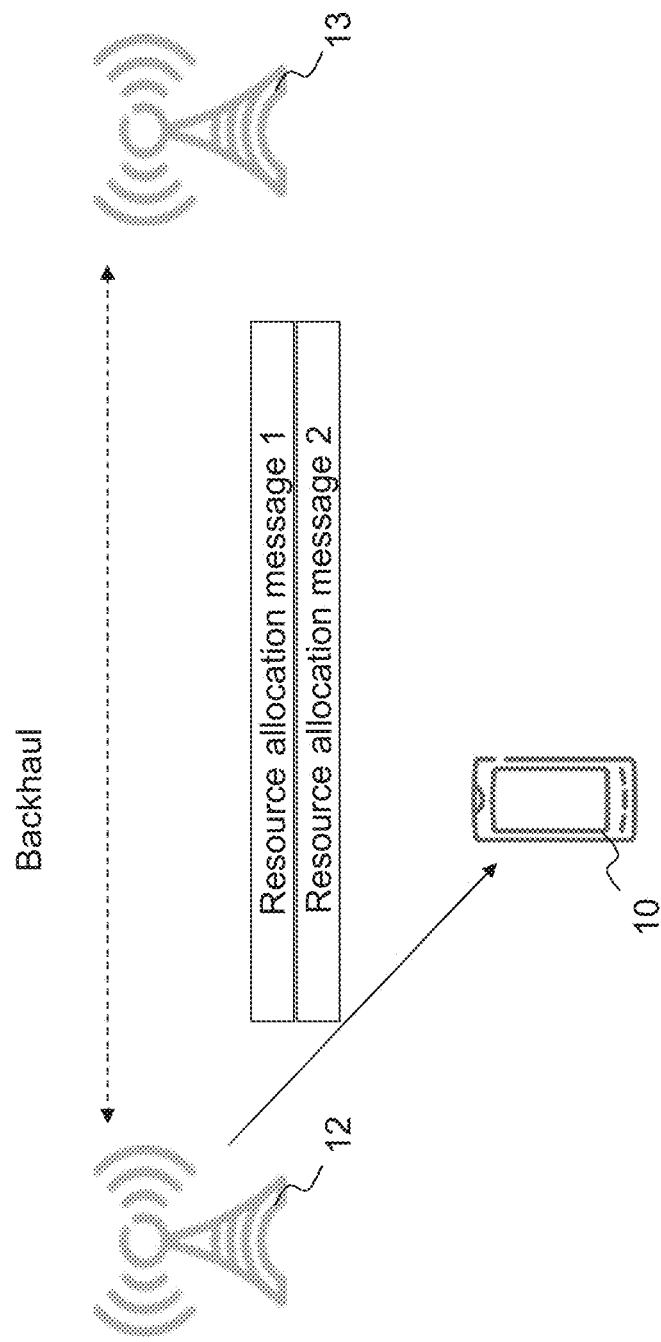
FIG. 7 illustrates the sending of resource allocations for each of two network nodes from a single network node.

Alternatively as explained above, the uplink scheduling grants or the downlink scheduling allocations relating to the two or more wireless network access points may be sent from a single network node, i.e. wireless network access point. As shown in FIG. 7, this will require the wireless network access points to communicate with one another via one or more backhaul links.

Figure 8:
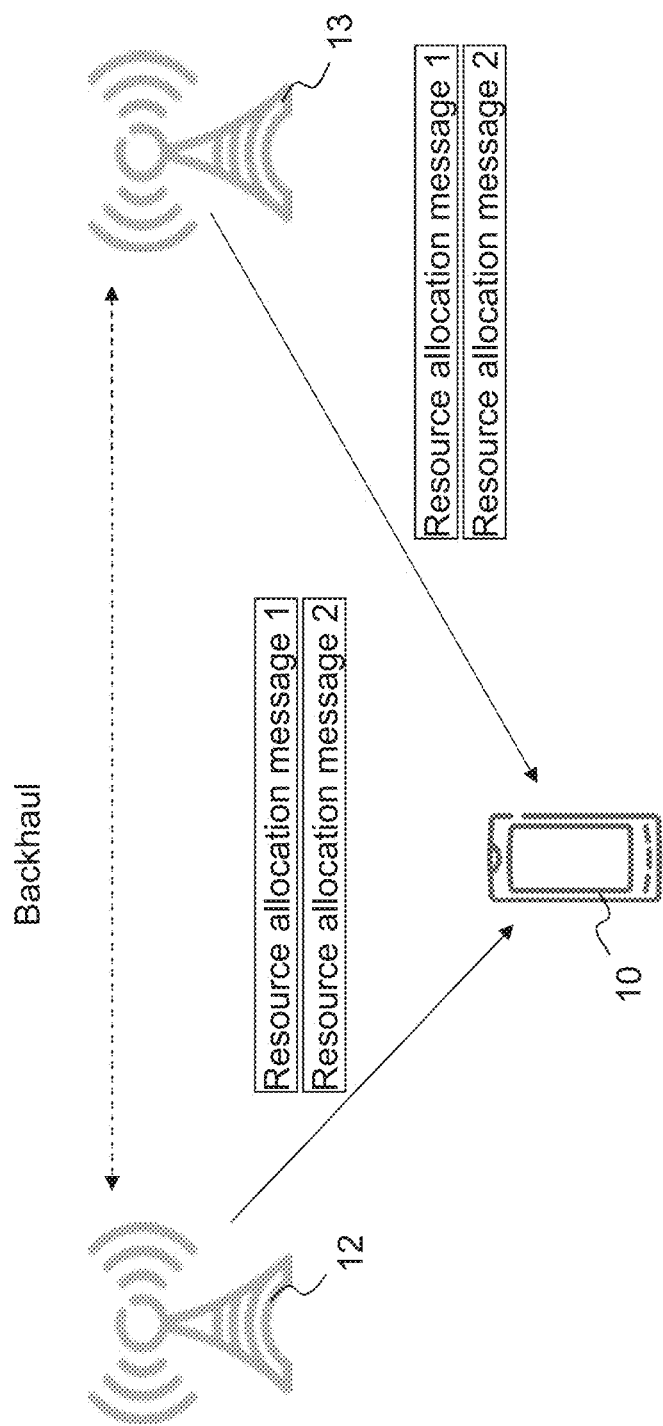
FIG. 8 illustrates the sending of resource allocations for each of two network nodes from both of the network nodes.

Another option is to send both, or two or more, uplink scheduling grants or downlink scheduling allocations from the two or more wireless network access points, in this example both wireless network access points 12, 13 in dual connectivity mode, as illustrated in FIG. 8. The format and coding of the combined message does not necessarily have to follow the format of legacy uplink scheduling grant messages or downlink resource allocation messages. As in the previous case, this approach requires backhaul communications between the first wireless network access point 12 and the second wireless network access point 13.

Coordination of UL and/or DL Scheduling in Dual Connectivity

The two or more wireless network access points 12, 13 may share and coordinate the UL scheduling grants and/or DL allocations for the two or more uplinks or downlinks, such that two uplink scheduling grants do not collide or overlap or interfere with each other and similarly so that two downlink resource allocations do not coincide or overlap on the same resources. In one example, the uplink resources assigned by the two scheduling grants and/or the downlink resources assigned by the two downlink resource allocations can be multiplexed in frequency to avoid collision. The coordination between the two or more network nodes or wireless network access points can be based on one or several predetermined rules. Several examples follow. In DL, the DL allocations are informed in the same subframe when the data is transmitted, thus, when the mobile terminal 10 sees that the DL allocations are done on the same resources in any subframe, then there will be a collision, and the mobile terminal 10 will not be able to retrieve the data. So, coordination is the solution in DL. Thus, priority rules here are applied by the wireless network access point only. In UL, the grants are given to the mobile terminal 10 at least 4 ms before the actual transmission. So, two things can be done: either wireless network access points coordinate before sending the UL grants, or the mobile terminal 10 may autonomously prioritize to which node the transmission should go to.

Prioritization of One Link Over Another One

According to one rule of scheduling coordination between the two or more links, if there are colliding uplink resource grant possibilities or colliding downlink resource allocation grant possibilities in two links, common resources, i.e., resources that are requested by both links, are assigned to a first link and the remaining ones are assigned to a second link.

Figure 9:
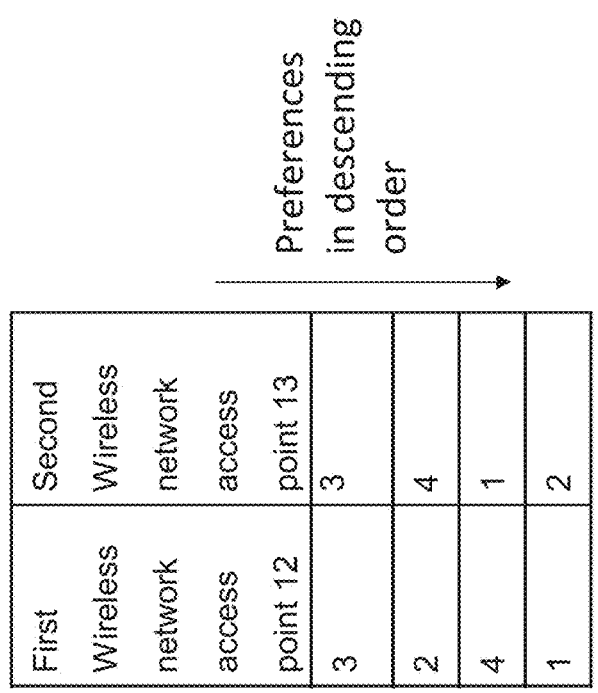
FIG. 9 illustrates an ordered preference for resource clusters for each of two nodes.

As an example, assume that the mobile terminal 10 is supposed to transmit/receive one cluster of uplink/downlink data to/from the first wireless network access point 12 and another cluster of uplink/downlink data with the same size to/from the second wireless network access point 13. Here, a cluster is defined as a group of contiguous Physical Resource Blocks (PRBs). In some texts, this cluster is referred to as a subband. Two wireless network access points may have differing orders of preference for resource grants/allocations with respect to an available cluster, for example, due to the respective qualities of the propagation channel in that cluster. An example of ordered preferences for resources is shown in FIG. 9. In this case, if the first wireless network access point 12 is prioritized over the second wireless network access point 13, then the first wireless network access point 12 gets cluster 3 and the second wireless network access point 13 gets cluster 4, which is not the best cluster of resources for the second wireless network access point, but is the second best and does not collide with clusters used by the first wireless network access point 12. Note that in the uplink we may also need to ensure that an assignment of multiple clusters to a given link uses contiguous resources, to minimize impairments to the mobile terminal's receiver. In this particular example, then, the second wireless network access point 13 may only be assigned the best available contiguous clusters, in view of the cluster or clusters already assigned to the first wireless network access point 12.

The prioritization of one wireless network access point over another may be based on one or several factors and/or parameters. For example, one wireless network access point may be prioritized over another based on link quality, i.e., the quality of the propagation channel from the mobile terminal 10 to the respective wireless network access point. One or several measures of link quality may be evaluated to determine which wireless network access point should be prioritized, such as attenuation, delay, or reliability of a link.

For instance, define the path-gain seen at both links as $PG_1$ and $PG_2$. If $PG_1 > PG_2$, then the second link is given priority, in some embodiments. The path-gain parameter may include all gains experienced by the radio signal as it passes through the entire propagation chain, e.g., the actual propagation path-gain due to distance, antenna gain, insertion loss and other losses seen at Radio Frequency (RF) links. In some cases, some of these components of the path-gain may be the same or insubstantially different for the two links, in which case these components might be ignored in the path-gain calculation for purposes of prioritization.

According to another example, one wireless network access point may be prioritized over another based on a predefined rule of prioritization. For instance, in a dual connectivity scheme, one of the wireless network access points may be configured as an anchor node (e.g. Master eNB or base station) while the other one is configured as a booster node (e.g. Secondary eNB or base station). In this case, a rule of prioritization may be, for example, that the anchor node is always prioritized over the booster node. According to still another example, the predefined rule may specify that a link with a larger uplink or downlink buffer status, i.e. a link on which the mobile terminal 10 has more data to send, is prioritized by the mobile terminal 10. A variation applicable to all of these approaches is that the anchor node can be configured to make a decision on which wireless network access point should be prioritized, e.g., based on buffer status or other parameter(s).

Another approach is to prioritize one node, i.e. wireless network access point, or link over another based on power control requirements. Due to power limitations at the mobile terminal 10, the mobile terminal 10 may not be able to transmit with requested power to both links simultaneously. In some embodiments, the mobile terminal 10, or a controlling node, can decide to satisfy the link or links that requires the least power first and then transmit on the other link or links accordingly.

Fair Scheduling in Dual Connection

An alternative to the allocation of resources according to link priority is that the available resources are divided between two links with some measure of fairness. In a variation of this approach, the measure of fairness may be biased towards a link having greater priority. As an example, the allocations for current subframes may be defined, based on previous uplink/downlink transmissions. Round-robin uplink/downlink transmissions between wireless network access points on different links may be defined, for example.

UE-Autonomous Selection of Scheduling Grant

The preceding examples generally assumed that scheduling grants for multiple links in a dual-connectivity scenario are coordinated prior to being sent to the mobile terminal 10. Another approach is to provide the mobile terminal 10 with a degree of autonomy with respect to colliding scheduling grants that it has received. According to this approach, in the event of colliding scheduling grants, the mobile terminal 10 selects to transmit according to one of the grants and denies another one, autonomously. The selection may be based on quality of the link, or the ongoing UL traffic, etc. In some embodiments, the mobile terminal 10 may inform the relevant wireless network access point about a denied/refused UL grant, i.e. a denied/refused uplink resource grant.

Single Scheduling Allocation for Both UL/DL Transmissions

Figure 10:
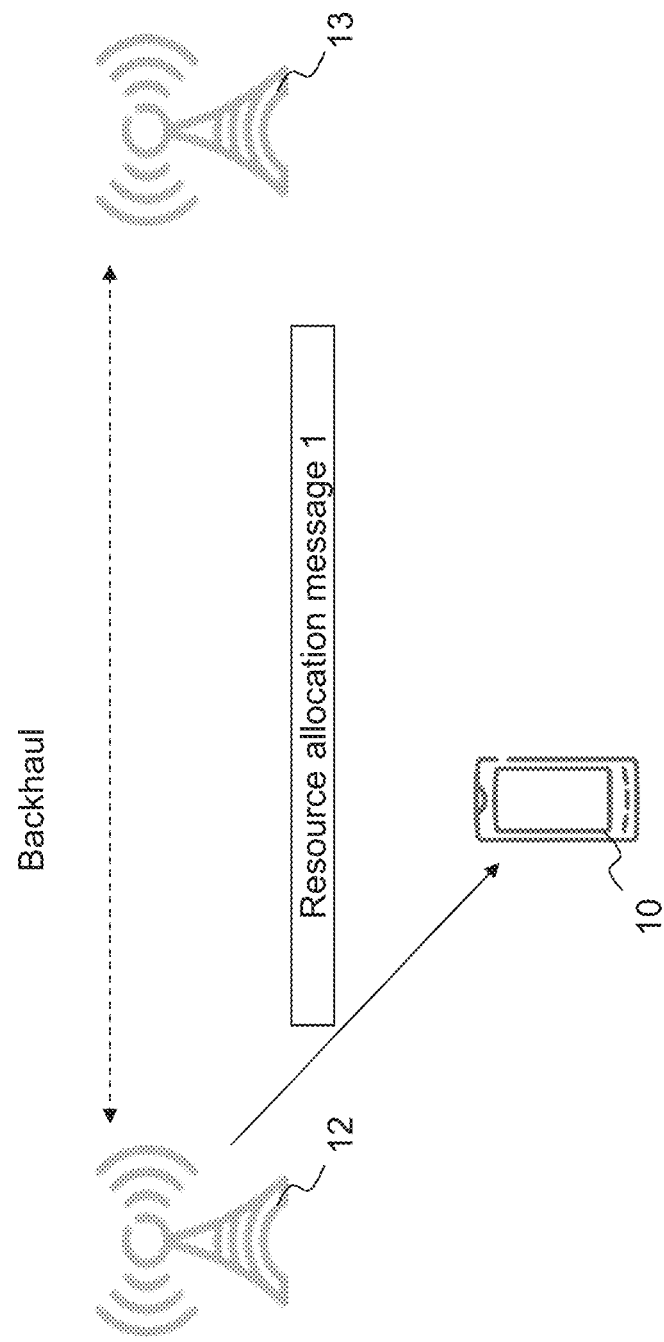
FIG. 10 illustrates the sending of a single resource allocation message comprising resource allocations for two or more network nodes.

In some embodiments, the anchor node, or one of the wireless network access points in the dual connectivity scenario, sends the uplink scheduling grants or downlink scheduling allocations to the mobile terminal 10, on behalf of the two wireless network access points, e.g., in a single scheduling message. This is shown in FIG. 10. The mobile terminal 10 is informed that a certain part of the grant/allocation is for the first wireless network access point 12 and the remaining part of the grant/allocation is for the second wireless network access point 13. Alternatively, the mobile terminal 10 is given a predefined rule for dividing the grants/allocations. In these embodiments, the scheduling information is exchanged between the two wireless network access points via backhaul. In some of these embodiments, the mobile terminal 10 can find the grants/allocations for the two links according to a predefined rule for dividing the grants/allocations. In others, the mobile terminal 10 may be given certain predefined guidelines, but is given the ultimate authority to decide in the end. Note that these approaches can be combined with any of the techniques described above for prioritizing or fairly scheduling the resources.

Figure 11:
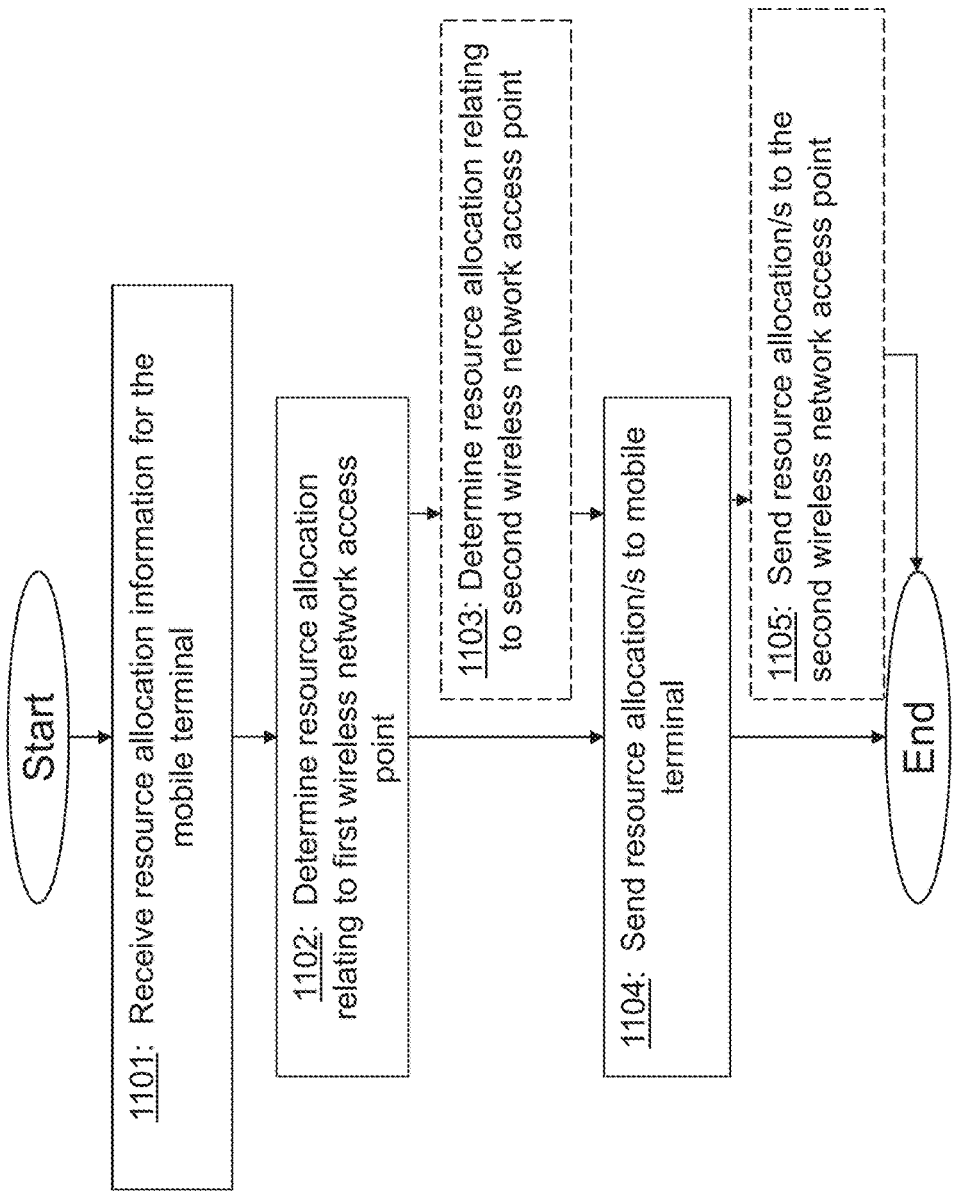
FIG. 11 shows a flowchart of a method in a wireless network access point according to embodiments herein.

The method actions in the first wireless network access point 12, for allocating uplink or downlink resources, to the mobile terminal 10 according to some embodiments will now be described with reference to a flowchart depicted in FIG. 11. The actions do not have to be taken in the order stated below, but may be taken in any suitable order. Actions performed in some embodiments are marked with dashed boxes. The mobile terminal 10 is configured for dual connectivity wherein the mobile terminal 10 supports two or more contemporaneous links with two or more wireless network access points comprising the first wireless network access point 12 and the second network access point 13.

Action 1101. The first wireless network access point 12 receives, from the second wireless network access point 13, resource allocation information for the mobile terminal 10 being in a dual connectivity mode.

Action 1102. The first wireless network access point 12 determines a resource allocation relating to the first wireless network access point 12 based on the received resource allocation information received from the second wireless network access point 13. The resource allocation relating to the first wireless network access point 12 may be an uplink resource grant for allocation of uplink resources or a downlink resource allocation for allocation of downlink resources.

To determine the resource allocation relating to the first wireless network access point 12 the first wireless network access point 12 may e.g. apply multiplexing, in the frequency domain, of resources of the first wireless network access point 12 with resources of the second wireless network access point 13.

Alternatively or additionally, determining, by the first wireless network access point 12, the resource allocation relating to the first wireless network access point 12 may in some embodiments comprise assigning resources to the resource allocation relating to the first wireless network access point 12 according to a priority for the link between the mobile terminal 10 and the first wireless network access point 12. The resources may be assigned in clusters of resources, and each wireless network access point may have ordered preferences for the clusters. The clusters may further be assigned one by one to the wireless network access points according to the priority of the respective link between each wireless network access point and the mobile terminal 10 and according to the ordered preferences. The priority for the link between the mobile terminal and the first wireless network access point 12 may be based on a link quality for the link, such that a better link quality, relative to a link quality for another wireless network access point, yields a higher priority. Alternatively or additionally, the priority for the link between the mobile terminal 10 and the first wireless network access point 12 may be based on a predetermined rule.

Action 1103. The first wireless network access point 12 may determine a resource allocation relating to the second wireless network access point 13. The resource allocation relating to the second wireless network access point 13 may be an uplink resource grant for allocation of uplink resources or a downlink resource allocation for allocation of downlink resources.

Action 1104. The first wireless network access point 12 sends, to the mobile terminal 10, a resource allocation message indicating the determined resource allocation relating to the first wireless network access point 12. As mentioned above, the resource allocation relating to the first wireless network access point 12 may be an uplink resource grant for allocation of uplink resources or a downlink resource allocation for allocation of downlink resources.

In some embodiments the first wireless network access point 12 also sends a resource allocation message, indicating the determined resource allocation relating to the second wireless network access point 13, to the mobile terminal 10. As mentioned above, the resource allocation relating to the second wireless network access point 13 may be an uplink resource grant for allocation of uplink resources or a downlink resource allocation for allocation of downlink resources. The resource allocations relating to the first wireless network access point 12 and the second wireless network access point 13 may be sent in a single message to the mobile terminal 10.

Action 1105. The first wireless network access point 12 may further send the resource allocation relating to the second wireless network access point 13 to the second wireless network access point 13, via a backhaul connection. In some embodiments the first wireless network access point 12 additionally or alternatively sends to the second wireless network access point 13, the resource allocation relating to the first wireless network access point 12. As mentioned above, the resource allocations relating to the first and second wireless network access points 12, 13 may be uplink resource grants for allocation of uplink resources or downlink resource allocations for allocation of downlink resources.

In the embodiments disclosed herein where the resource allocation relating to the first wireless network access point 12 is an uplink resource grant for allocation of uplink resources relating to the first wireless network access point 12 and the resource allocation relating to the second wireless network access point 13 is an uplink resource grant for allocation of uplink resources relating to the second wireless network access point 13, the resources are uplink resources and the priority for the link between the mobile terminal 10 and the first wireless network access point 12 is a priority for an uplink from the mobile terminal 10 to the first wireless network access point 12. Similarly, the priority of the respective link between each wireless network access point and the mobile terminal 10 is a priority for a respective uplink from the mobile terminal 10 to each wireless network access point. In some of these embodiments, a same carrier frequency, e.g. a same uplink carrier frequency, may further be used for the two or more contemporaneous links for uplink.

In the embodiments disclosed herein where the resource allocation relating to the first wireless network access point 12 is a downlink resource allocation for allocation of downlink resources relating to the first wireless network access point 12 and the resource allocation relating to the second wireless network access point 13 is a downlink resource allocation for allocation of downlink resources relating to the second wireless network access point 13, the resources are downlink resources, a same carrier frequency, e.g. a same downlink carrier frequency, is used for the two or more contemporaneous links for downlink and the priority for the link between the mobile terminal 10 and the first wireless network access point 12 is a priority for a downlink from the first wireless network access point 12 to the mobile terminal 10. Similarly, the priority of the respective link between each wireless network access point and the mobile terminal 10 is a priority for a respective downlink from the mobile terminal 10 to each wireless network access point.

Figure 12:
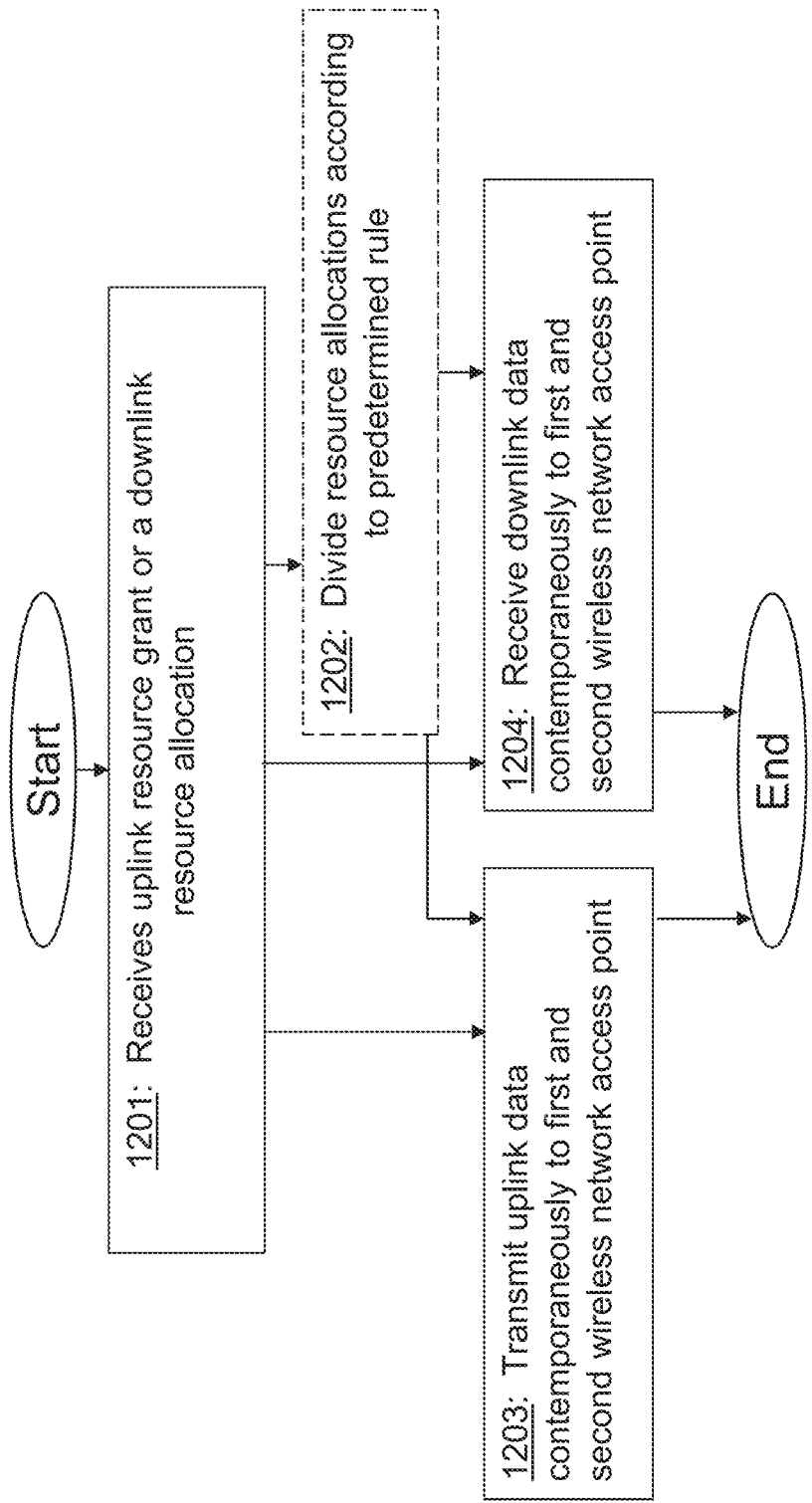
FIG. 12 shows a flowchart of a method in a mobile terminal according to embodiments herein.

The method actions in the mobile terminal 10 for communicating data to or from the mobile terminal 10 according to some embodiments will now be described with reference to a flowchart depicted in FIG. 12. The mobile terminal 10 is configured for dual connectivity wherein the mobile terminal 10 supports two or more contemporaneous links with two or more wireless network access points comprising a first wireless network access point 12 and a second network access point 13. The actions do not have to be taken in the order stated below, but may be taken in any suitable order. Actions performed in some embodiments are marked with dashed boxes.

Action 1201. The mobile terminal 10 receives, when being in a dual connectivity mode, from the first wireless network access point 12, respective uplink resource grants for allocation of uplink resources or respective downlink resource allocations for allocation of downlink resources relating to respective ones of the first wireless network access point 12 and the second wireless network access point 13.

Action 1202. The mobile terminal 10 may, when the uplink resource grants or downlink resource allocations relating to the first wireless network access point 12 and the second wireless network access point 13 are received in a single message, divide resource allocations, as stated above, in the single message between the first wireless network access point 12 and the second wireless network access point 13 according to a predetermined rule.

Action 1203. The mobile terminal 10 transmits uplink data to the first wireless network access point 12 and the second wireless network access point 13, contemporaneously while the wireless network access points are independent from each other, according to the received respective uplink resource grants.

Action 1204. Alternatively, the mobile terminal 10 receives downlink data from the first wireless network access point 12 and the second wireless network access point 13, contemporaneously while the wireless network access points are independent from each other, according to the received respective downlink resource allocations.

With the above techniques in mind, it will be appreciated that the process flow diagram of FIG. 13 illustrates a method, as implemented in the first wireless network access point 12, for allocating uplink resources to the mobile terminal that is configured to support two or more contemporaneous links with two or more corresponding wireless network access points. It will be appreciated that several of the detailed techniques described above are examples of the method in FIG. 13.

As shown at block 1310, the illustrated method begins with receiving, from a second wireless network access point, uplink/downlink resource allocation information for the mobile terminal. As shown at block 1320, an uplink resource grant/downlink resource allocation for each of the first and second wireless network access points is then sent to the mobile terminal.

In some embodiments, the illustrated method further comprises determining the uplink resource grant/downlink resource allocation for the first wireless network access point based on the uplink/downlink resource allocation information received from the second wireless network access point. In these and in other embodiments, the uplink resource grants/downlink resource allocations for the first and second wireless network access points may be sent in a single message. In some of these or other embodiments, the method still further comprises determining the uplink resource grant/downlink resource allocation for the second wireless network access point and sending the uplink resource grant/downlink resource allocation for the second wireless network access point to the second wireless network access point, via a backhaul connection.

FIG. 14 is a process flow diagram illustrating another method for allocating uplink/downlink resources to the mobile terminal 10 that is configured to support two or more contemporaneous links with two or more corresponding wireless network access points, again as implemented in a first one of two or more wireless network access points communicating with the mobile terminal 10. As shown at block 1410, the illustrated method begins with receiving, from a second wireless network access point, uplink/downlink resource allocation information for the mobile terminal 10. As shown at block 1420, the method continues with determining an uplink resource grant/downlink resource allocation for the first wireless network access point based on the uplink/downlink resource allocation information received from the second wireless network access point 13. Finally, as shown at block 1430, an uplink resource grant/downlink resource allocation for at least the first wireless network access point 12 is sent to the mobile terminal 10.

In some embodiments, determining the uplink resource grant/downlink resource allocation for the first wireless network access point 12 comprises multiplexing, in the frequency domain, uplink/downlink resources between the uplink resource grants/downlink resource allocations for the first and second wireless network access points. In some embodiments, determining the uplink resource grant/downlink resource allocation for the first wireless network access point comprises assigning uplink/downlink resources to the uplink resource grant/downlink resource allocation for the first wireless network access point according to a priority for the uplink/downlink from/to the mobile terminal 10 to/from the first wireless network access point 12. In some of these embodiments, uplink/downlink resources are allocated in clusters of resources and each wireless network access point has ordered preferences for the clusters, and clusters are assigned one by one to the wireless network access points according to the priority of each wireless network access point and according to the ordered preferences.

In some embodiments, the priority for the uplink/downlink from/to the mobile terminal to/from the first wireless network access point is based on a link quality for the uplink/downlink, such that a better link quality, relative to a link quality for another wireless network access point, yields a higher priority. In some of these embodiments, the link quality is a path-gain between the mobile terminal and the first wireless network access point.

In some embodiments, the priority for the uplink/downlink from/to the mobile terminal to/from the first wireless network access point is based on a predetermined rule. For example, in some embodiments the predetermined rule indicates that an anchor node is always prioritized over a booster node. In some embodiments, the predetermined rule indicates that a link with a larger buffer status is prioritized over a link with a smaller buffer status.

Any of the previous embodiments may further comprise sending the uplink resource grant/downlink resource allocation for the first wireless network access point 12 to the second wireless network access point 13. Likewise, any of the previous embodiments may further comprise sending the uplink resource grant/downlink resource allocation for the first wireless network access point 12 to the second wireless network access point 13.

Figure 15:
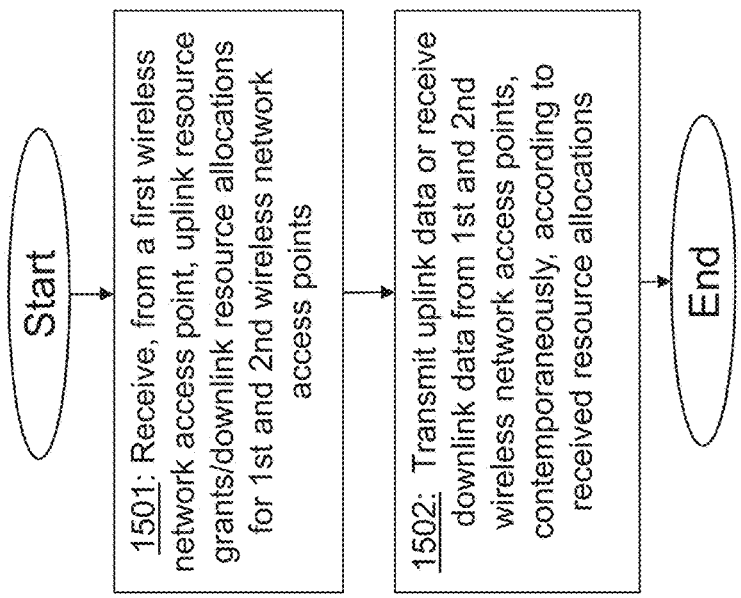
FIG. 15 is a process flow diagram illustrating another example method according to some of the disclosed techniques.

The process flow diagram of FIG. 15 illustrates a method in the mobile terminal 10 that is configured to support two or more contemporaneous links with two or more corresponding wireless network access points. The two or more contemporaneous links may be configured to use a same downlink carrier frequency for downlink. The two or more contemporaneous links may further be configured to use a same uplink carrier frequency for uplink. As shown at block 1510, the method begins with receiving, from a first wireless network access point, uplink resource grants/downlink resource allocations for each of the first wireless network access point 12 and a second wireless network access point 13. As shown at block 1520, the method continues with transmitting uplink data to the first and second wireless network access points, contemporaneously, according to the received uplink resource grants; or receiving downlink data from the first and second wireless network access points, contemporaneously, according to the received downlink resource allocations. In some embodiments, the uplink resource grants/downlink resource allocations for the first and second wireless network access points are received in a single allocation message, and the method further comprises dividing resource allocations in the single allocation message between the first and second wireless network access points according to a predetermined rule.

Hardware Implementations

Figure 16:
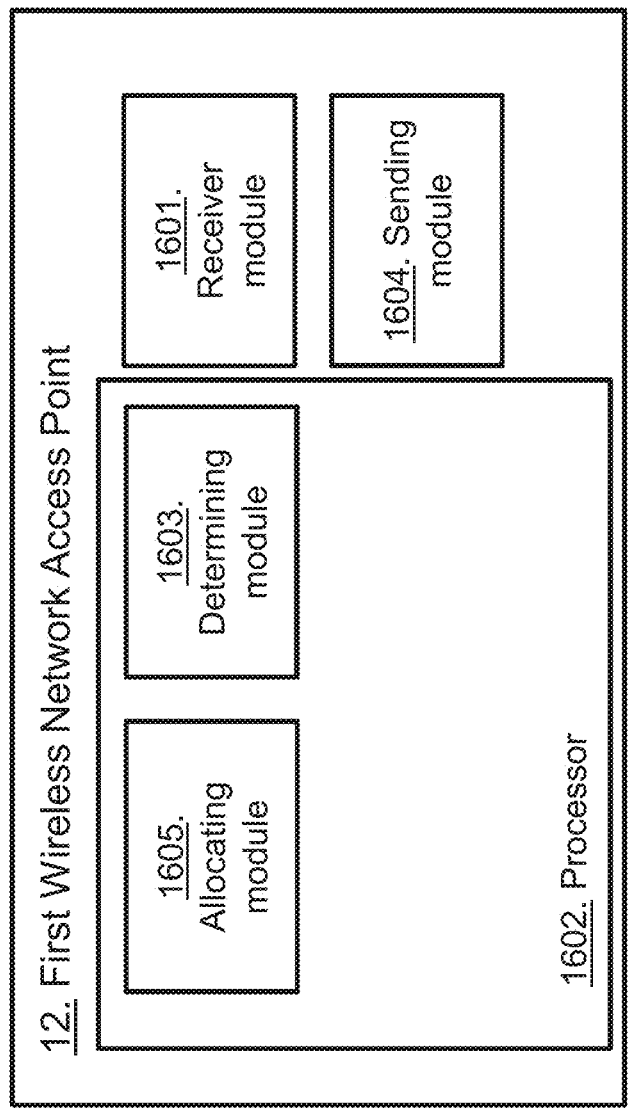
FIG. 16 is a block diagram illustrating elements of an example wireless network node, according to some embodiments.

In order to perform the methods herein the first wireless network access point 12 is provided. FIG. 16 is a block diagram illustrating the first wireless network access point 12 for allocating uplink or downlink resources, to the mobile terminal 10 that is configured for dual connectivity. The mobile terminal 10 hence supports two or more contemporaneous links with two or more wireless network access points comprising the first wireless network access point 12 and the second network access point 13. The first wireless network access point 12 may comprise a receiver module 1601 and/or a processor 1602. The first wireless network access point 12, the receiver module 1601 and/or the processor 1602 may be configured to receive, from the second wireless network access point 13, resource allocation information for the mobile terminal 10 being in the dual connectivity mode.

The first wireless network access point 12 may comprise a determining module 1603. The first wireless network access point 12, the determining module 1603 and/or the processor 1602 may be configured to determine a resource allocation, in form of an uplink resource grant for allocation of uplink resources or a downlink resource allocation for allocation of downlink resources, relating to the first wireless network access point 12 based on the received resource allocation information received from the second wireless network access point 13.

The first wireless network access point 12 may comprise a sending module 1604. The first wireless network access point 12, the sending module 1604 and/or the processor 1602 may be configured to send, to the mobile terminal 10, the determined resource allocation, in form of the uplink resource grant for allocation of uplink resources or the downlink resource allocation for allocation of downlink resources, relating to the first wireless network access point 12. The determined resource allocation relating to the first wireless network access point 12 may in some embodiments be indicated to the mobile terminal 10 in a resource allocation message that is sent to the mobile terminal 10.

The first wireless network access point 12, the determining module 1603 and/or the processor 1602 may further be configured to determine a resource allocation, in form of an uplink resource grant for allocation of uplink resources or a downlink resource allocation for allocation of downlink resources, relating to the second wireless network access point 13. The first wireless network access point 12, the sending module 1604 and/or the processor 1602 may then be configured to send the determined resource allocation, in form of the uplink resource grant or the downlink resource allocation, relating to the second wireless network access point 13 to the mobile terminal 10. The determined resource allocation relating to the second wireless network access point 13 may in some embodiments be indicated to the mobile terminal 10 in a resource allocation message that is sent to the mobile terminal 10. The first wireless network access point 12, the sending module 1604 and/or the processor 1602 may also be configured to send the resource allocations, in form of the uplink resource grants or the downlink resource allocations, relating to the first wireless network access point 12 and the second wireless network access point 13 in a single message to the mobile terminal 10. The first wireless network access point 12, the sending module 1604 and/or the processor 1602 may further be configured to send the uplink resource grant for allocation of uplink resources or the downlink resource allocation for allocation of downlink resources relating to the second wireless network access point 13 to the second wireless network access point 13, via a backhaul connection.

The first wireless network access point 12, the determining module 1603 and/or the processor 1602 may further be configured to determine the resource allocation, in form of the uplink resource grant or the downlink resource allocation, relating to the first wireless network access point 12 by multiplexing, in the frequency domain, uplink resources of the first wireless network access point 12 with uplink resources of the second wireless network access point 13, or downlink resources of the first wireless network access point 12 with downlink resources of the second wireless network access point 13.

The first wireless network access point 12, the determining module 1603 and/or the processor 1602 may further be configured to determine the resource allocation, in form of the uplink resource grant or the downlink resource allocation relating to the first wireless network access point 12 by assigning uplink resources to the uplink resource grant or downlink resources to the downlink resource allocation relating to the first wireless network access point 12 according to a priority for the uplink from the mobile terminal 10 to the first wireless network access point 12 or the downlink from the first wireless network access point 12 to the mobile terminal 10. The first wireless network access may comprise an allocating or assigning module 1605. The first wireless network access point 12, the allocating module 1605 and/or the processor 1602 may be configured to allocate or assign uplink or downlink resources in clusters of resources. Each wireless network access point may have ordered preferences for the clusters, and first wireless network access point 12, the allocating or assigning module 1605 and/or the processor 1602 may further be configured to assign clusters one by one to the wireless network access points according to the priority of the respective uplink or downlink between each wireless network access point and the mobile terminal 10, and according to the ordered preferences. The priority for the uplink from the mobile terminal 10 to the first wireless network access point 12, or the downlink from the first wireless network access point 12 to the mobile terminal 10, may be based on a link quality for the uplink or downlink, such that a better link quality, relative to a link quality for another wireless network access point, yields a higher priority. Alternatively, the priority for the uplink from the mobile terminal 10 to the first wireless network access point 12 or the downlink from the first wireless network access point 12 to the mobile terminal 10 may be based on a predetermined rule.

The first wireless network access point 12, the sending module 1604 and/or the processor 1602 may further be configured to send the resource allocation, in form of the uplink resource grant or the downlink resource allocation, relating to the first wireless network access point 12 to the second wireless network access point 13 via a backhaul connection.

The two or more contemporaneous links may be configured to use a same carrier frequency, e.g. a same downlink carrier frequency, for downlink and the first wireless network access point 12, the determining module 1603 and/or the processor 1602 may further be configured to determine the downlink resource allocation for allocation of downlink resources relating to the first wireless network access point 12 based on the received resource allocation information. Then, the first wireless network access point 12, the sending module 1604 and/or the processor 1602 may further be configured to send, to the mobile terminal 10, the downlink resource allocation for allocation of downlink resources relating to the first wireless network access point 12.

Alternatively or additionally, the two or more contemporaneous links may be configured to use a same carrier frequency, e.g. a same uplink carrier frequency, for uplink and the first wireless network access point 12, the determining module 1603 and/or the processor 1602 may further be configured to determine the uplink resource grant for allocation of uplink resources relating to the first wireless network access point 12 based on the received resource allocation information. Then, the first wireless network access point 12, the sending module 1604 and/or the processor 1602 may further be configured to send, to the mobile terminal 10, the uplink resource allocation for allocation of uplink resources relating to the first wireless network access point 12.

Figure 17:
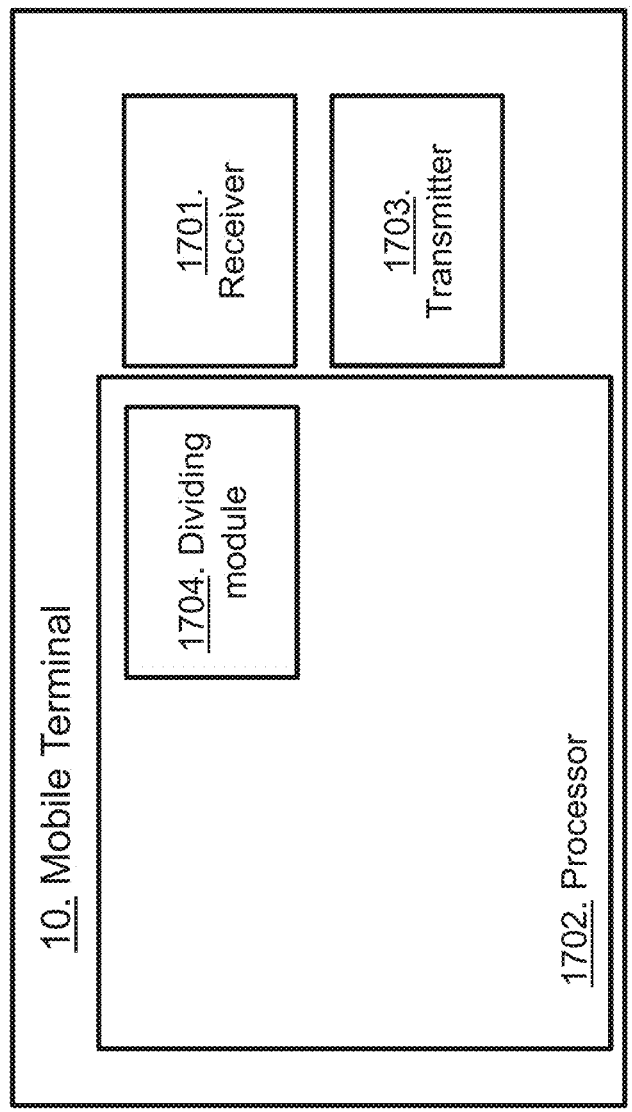
FIG. 17 is a block diagram illustrating elements of an example mobile terminal, according to some embodiments.

In order to perform the methods herein the mobile terminal 10 is also provided. FIG. 17 is a block diagram depicting the mobile terminal 10 for communicating data to or from the mobile terminal 10, which mobile terminal 10 is configured for dual connectivity wherein the mobile terminal 10 supports two or more contemporaneous links with two or more wireless network access points comprising the first wireless network access point 12 and the second wireless network access point 13. The two or more contemporaneous links may be configured to use a same downlink carrier frequency for downlink. The two or more contemporaneous links may further be configured to use a same uplink carrier frequency for uplink. The mobile terminal 10 may comprise a receiver 1701 and/or a processor 1702. The mobile terminal 10, the receiver 1701 and/or the processor 1702 may be configured to receive, when being in a dual connectivity mode, from the first wireless network access point 12, respective uplink resource grants for allocation of uplink resources or respective downlink resource allocations for allocation of downlink resources relating to respective ones of the first wireless network access point 12 and the second wireless network access point 13.

The mobile terminal 10 comprises a transmitter 1703. The mobile terminal 10, the transmitter 1703 and/or the processor 1702 may be configured to transmit uplink data to the first wireless network access point 12 and the second wireless network access point 13, contemporaneously while the wireless network access points are independent from each other, according to the received respective uplink resource grants, or the mobile terminal 10, the receiver 1701 and/or the processor 1702 may be configured to receive downlink data from the first wireless network access point 12 and the second wireless network access point 13, contemporaneously while the wireless network access points are independent from each other, according to the received respective downlink resource allocations.

The mobile terminal 10, the receiver 1701 and/or the processor 1702 may be configured to receive the uplink resource grants or downlink resource allocations relating to the first wireless network access point 12 and the second wireless network access point 13 in a single message. The mobile terminal 10 may comprise a dividing module 1704. The mobile terminal 10, the dividing module 1704 and/or the processor 1702 may be configured to divide resource allocations in the single message between the first wireless network access point 12 and the second wireless network access point 13 according to a predetermined rule.

Figure 18:
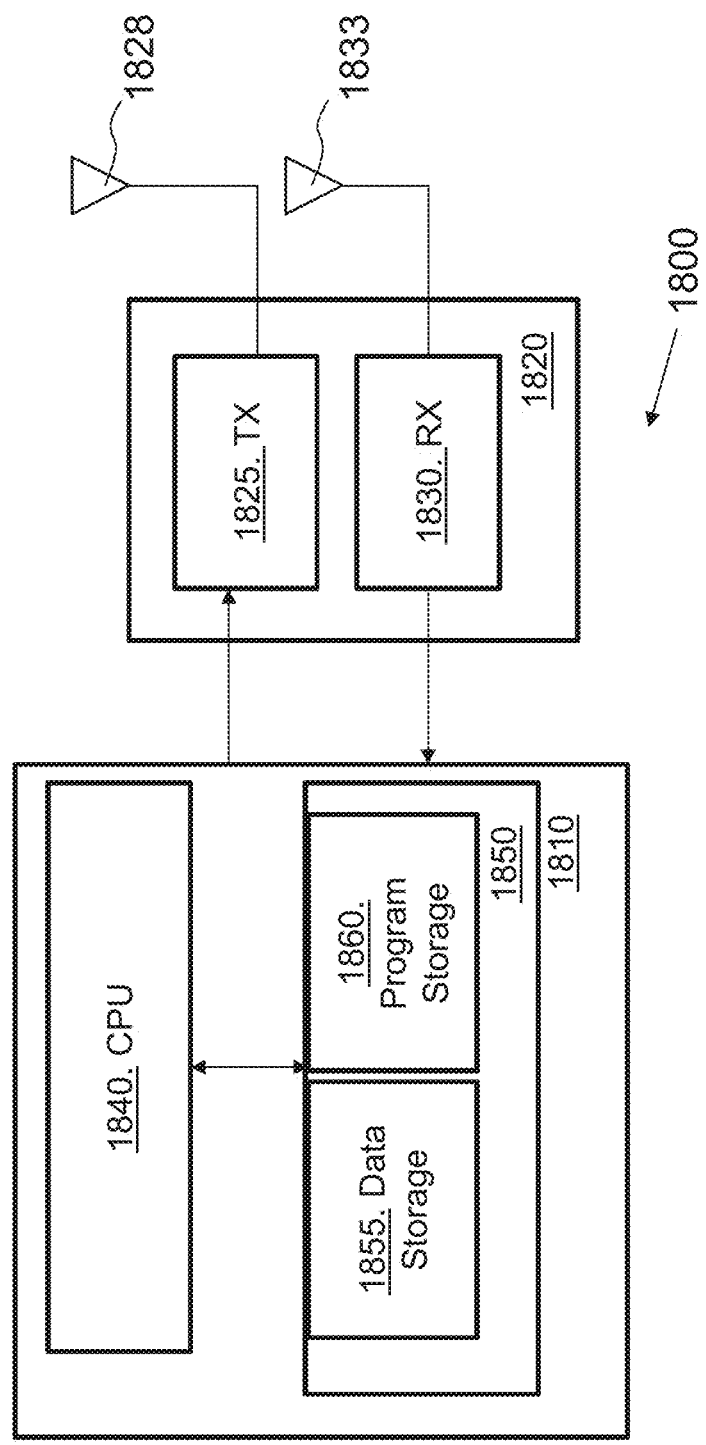
FIG. 18 is a block diagram illustrating elements of an example mobile terminal, according to some embodiments.

Several of the techniques and methods described above may be implemented using radio circuitry and electronic data processing circuitry provided in a mobile terminal. FIG. 18 illustrates features of an example mobile terminal 1800 according to several embodiments of the present invention. Mobile terminal 1800, which may be the mobile terminal 10 or a UE configured for dual-connectivity operation with an LTE network (E-UTRAN), for example, comprises a transceiver unit 1820 for communicating with one or more base stations as well as a processing circuit 1810 for processing the signals transmitted and received by the transceiver unit 1820. Transceiver unit 1820 includes a transmitter 1825 coupled to one or more transmit antennas 1828 and receiver 1830 coupled to one or more receiver antennas 1833. The same antenna(s) 1828 and 1833 may be used for both transmission and reception. Receiver 1830 and transmitter 1825 use known radio processing and signal processing components and techniques, typically according to a particular telecommunications standard such as the 3GPP standards for LTE. Note also that transceiver unit 1820 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1810 comprises one or more processors 1840 coupled to one or more memory devices 1850 that make up a data storage memory 1855 and a program storage memory 1860. Processor 1840, identified as CPU 1840 in FIG. 18, may be a microprocessor, microcontroller, or digital signal processor, in some embodiments. More generally, processing circuit 1810 may comprise a processor/firmware combination, or specialized digital hardware, or a combination thereof. Memory 1850 may comprise one or several types of memory such as read-only memory (ROM), random-access memory, cache memory, flash memory devices, optical storage devices, etc. Because mobile terminal 1800 supports multiple radio access networks, processing circuit 1810 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1810 include modulation and coding of transmitted signals and the demodulation and decoding of received signals. In several embodiments of the present invention, processing circuit 1810 is adapted, using suitable program code stored in program storage memory 1860, for example, to carry out one of the techniques described above for managing uplink resource allocations. Of course, it will be appreciated that not all of the steps of these techniques are necessarily performed in a single microprocessor or even in a single module.

Figure 19:
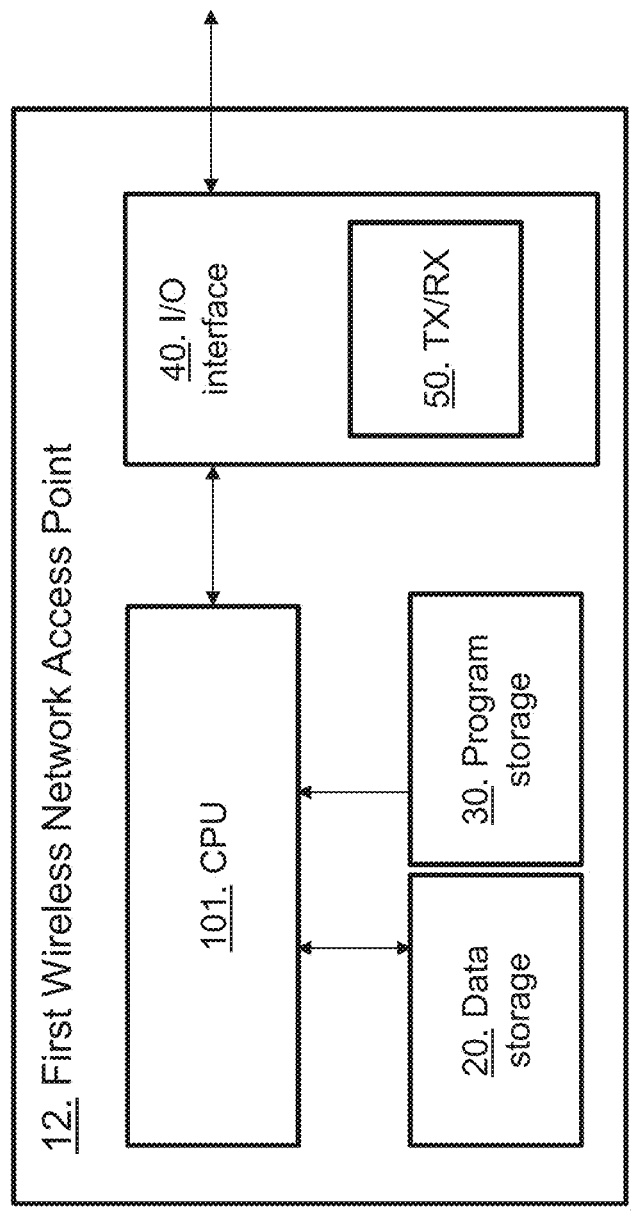
FIG. 19 is a block diagram illustrating elements of an example wireless network node, according to some embodiments.

Similarly, several of the techniques and processes described above can be implemented in a network node, such as an eNodeB or other node in a 3GPP network. FIG. 19 is a schematic illustration of a first wireless access point 12 in which a method embodying any of the presently described network-based techniques can be implemented. A computer program for controlling the first wireless access point 12 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 101, retrieving data as required from the data storage 20. Output information resulting from performance of a method embodying the present invention can be stored back in the data storage 20, or sent to an Input/Output (I/O) interface 40, which includes a network communications interface circuit for sending and receiving data to and from other network nodes and which may also include a radio transceiver (TX/RX) 50 for communicating with one or more terminals.

Accordingly, in various embodiments of the invention, processing circuits, such as the CPU 101 and memory circuits 20 and 30 in FIG. 19, are configured to carry out one or more of the techniques described in detail above. Likewise, other embodiments may include base stations and/or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the scope of present inventive concepts. Thus, to the maximum extent allowed by law, the scope of present inventive concepts are to be determined by the broadest permissible interpretation of the present disclosure, and shall not be restricted or limited by the foregoing detailed description.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method, performed by a first wireless network access point, for allocating uplink and/or downlink resources, to a mobile terminal that is configured for dual connectivity wherein the mobile terminal supports two or more contemporaneous links with two or more wireless network access points comprising the first wireless network access point and a second wireless network access point, the method comprising:
   receiving, from the second wireless network access point, resource allocation information for the mobile terminal being in a dual connectivity mode, the resource allocation information specifying uplink and/or downlink resources for the mobile terminal;
   determining a resource allocation relating to the first wireless network access point based on the received resource allocation information received from the second wireless network access point, wherein the resource allocation relating to the first wireless network access point allocates resources for use by the mobile terminal in communicating with the first wireless network access point; and
   sending, to the mobile terminal, a resource allocation message indicating the determined resource allocation relating to the first wireless network access point.

2. The method of claim 1, further comprising:
   determining a resource allocation relating to the second wireless network access point, wherein the resource allocation relating to the second wireless network access point allocates resources for use by the mobile terminal in communicating with the second wireless network access point; and wherein the sending comprises sending a resource allocation message indicating the determined resource allocation relating to the second wireless network access point to the mobile terminal.

3. The method of claim 2, wherein the resource allocations relating to the first wireless network access point and the second wireless network access point are sent in a single message to the mobile terminal.

4. The method of claim 2, further comprising:
   sending the resource allocation relating to the second wireless network access point to the second wireless network access point, via a backhaul connection.

5. The method of claim 1, wherein determining the resource allocation relating to the first wireless network access point comprises applying multiplexing, in the frequency domain, of resources of the first wireless network access point with resources of the second wireless network access point.

6. The method of claim 1, wherein determining the resource allocation relating to the first wireless network access point comprises assigning resources to the resource allocation relating to the first wireless network access point according to a priority for the link between the mobile terminal and the first wireless network access point.

7. The method of claim 6, wherein the resources are assigned in clusters of resources, and wherein each wireless network access point has ordered preferences for the clusters, and wherein clusters are assigned one by one to the two or more wireless network access points according to the priority of the respective link between each wireless network access point and the mobile terminal and according to the ordered preferences.

8. The method of claim 6, wherein the priority for the link between the mobile terminal and the first wireless network access point is based on a link quality for the link, such that a better link quality, relative to a link quality for another wireless network access point, yields a higher priority.

9. The method of claim 6, wherein the priority for the link between the mobile terminal and the first wireless network access point is based on a predetermined rule for priority of the link between the mobile terminal and the first wireless network access point, relative to others of the two or more contemporaneous links.

10. The method of claim 1, further comprising sending the resource allocation relating to the first wireless network access point to the second wireless network access point via a backhaul connection.

11. The method of claim 6, wherein the resources are uplink resources, the priority for the link between the mobile terminal and the first wireless network access point is a priority for an uplink from the mobile terminal to the first wireless network access point, and the resource allocation relating to the first wireless network access point is an uplink resource grant for allocation of uplink resources relating to the first wireless network access point and the resource allocation relating to the second wireless network access point is an uplink resource grant for allocation of uplink resources relating to the second wireless network access point.

12. The method of claim 6, wherein the resources are downlink resources, a same carrier frequency is used for the two or more contemporaneous links for downlink, the priority for the link between the mobile terminal and the first wireless network access point is a priority for a downlink from the first wireless network access point to the mobile terminal and the resource allocation relating to the first wireless network access point is a downlink resource allocation for allocation of downlink resources relating to the first wireless network access point and the resource allocation relating to the second wireless network access point is a downlink resource allocation for allocation of downlink resources relating to the second wireless network access point.

13. A method performed by a mobile terminal for communicating data to or from the mobile terminal, which mobile terminal is configured for dual connectivity wherein the mobile terminal supports two or more contemporaneous links with two or more wireless network access points comprising a first wireless network access point and a second wireless network access point, the method comprising:
  receiving when being in a dual connectivity mode, from the first wireless network access point, respective uplink resource grants for allocation of uplink resources or respective downlink resource allocations for allocation of downlink resources relating to respective ones of the first wireless network access point and the second wireless network access point, wherein the uplink resource grants and downlink resource allocations relating to the first wireless network access point allocate resources for use by the mobile terminal in communicating with the first wireless network access point and the uplink resource grants and downlink resource allocations relating to the second wireless network access point allocate resources for use by the mobile terminal in communicating with the second wireless network access point; and
  transmitting uplink data to the first wireless network access point and the second wireless network access point, contemporaneously while the wireless network access points are independent from each other, according to the received respective uplink resource grants, or
  receiving downlink data from the first wireless network access point and the second wireless network access point, contemporaneously while the wireless network access points are independent from each other, according to the received respective downlink resource allocations.

14. The method of claim 13, wherein the uplink resource grants or downlink resource allocations relating to the first wireless network access point and the second wireless network access point are received in a single message, and wherein the method further comprises:
  dividing resource allocations in the single message between the first wireless network access point and the second wireless network access point according to a predetermined rule for priority of the link between the mobile terminal and the first wireless network access point, relative to the link between the mobile terminal and the second wireless network access point.

15. A first wireless network access point for allocating uplink and/or downlink resources, to a mobile terminal that is configured for dual connectivity, wherein the mobile terminal supports two or more contemporaneous links with two or more wireless network access points comprising the first wireless network access point and a second wireless network access point, wherein the first wireless network access point comprises
  a transmitter and a receiver, and
  a processing circuit configured to:
    receive, from the second wireless network access point, resource allocation information for the mobile terminal being in a dual connectivity mode the resource allocation information specifying uplink and/or downlink resources for the mobile terminal;
    determine a resource allocation relating to the first wireless network access point based on the received resource allocation information received from the second wireless network access point, wherein the resource allocation relating to the first wireless network access point allocates resources for use by the mobile terminal in communicating with the first wireless network access point; and to
    send, to the mobile terminal, a resource allocation message indicating the determined resource allocation relating to the first wireless network access point.

16. The first wireless network access point of claim 15, wherein the processing circuit is further configured to:
  determine a resource allocation relating to the second wireless network access point, wherein the resource allocation relating to the second wireless network access point allocates resources for use by the mobile terminal in communicating with the second wireless network access point; and further configured to send a resource allocation message indicating the determined resource allocation relating to the second wireless network access point to the mobile terminal.

17. The first wireless network access point of claim 16, wherein the processing circuit is configured to send the resource allocations relating to the first wireless network access point and the second wireless network access point in a single message to the mobile terminal.

18. The first wireless network access point of claim 16, wherein the processing circuit is configured to send the resource allocation relating to the second wireless network access point to the second wireless network access point, via a backhaul connection.

19. The first wireless network access point of claim 15, wherein the processing circuit is configured to determine the resource allocation relating to the first wireless network access point by applying multiplexing, in the frequency domain, of resources of the first wireless network access point with resources of the second wireless network access point.

20. The first wireless network access point of claim 15, wherein the processing circuit is configured to determine the resource allocation relating to the first wireless network access point by assigning resources to the resource allocation relating to the first wireless network access point according to a priority for the link between the mobile terminal and the first wireless network access point.

21. The first wireless network access point of claim 20, wherein the processing circuit is configured to assign the resources in clusters of resources, and wherein each wireless network access point has ordered preferences for the clusters, and wherein the wherein the processing circuit is configured to assign clusters one by one to the two or more wireless network access points according to the priority of the respective link between each wireless network access point and the mobile terminal and according to the ordered preferences.

22. The first wireless network access point of claim 20, wherein the priority for the link between the mobile terminal and the first wireless network access point is based on a link quality for the link, such that a better link quality, relative to a link quality for another wireless network access point, yields a higher priority.

23. The first wireless network access point of claim 20, wherein the priority for the link between the mobile terminal and the first wireless network access point is based on a predetermined rule for priority of the link between the mobile terminal and the first wireless network access point, relative to others of the two or more contemporaneous links.

24. The first wireless network access point of claim 15, wherein the processing circuit is configured to send the resource allocation relating to the first wireless network access point to the second wireless network access point via a backhaul connection.

25. The first wireless network access point of claim 20, wherein the resources are uplink resources, the priority for the link between the mobile terminal and the first wireless network access point is a priority for an uplink from the mobile terminal to the first wireless network access point, and the resource allocation relating to the first wireless network access point is an uplink resource grant for allocation of uplink resources relating to the first wireless network access point and the resource allocation relating to the second wireless network access point is an uplink resource grant for allocation of uplink resources relating to the second wireless network access point.

26. The first wireless network access point of claim 20, wherein the resources are downlink resources, the two or more contemporaneous links are configured to use a same carrier frequency for downlink, the priority for the link between the mobile terminal and the first wireless network access point is a priority for a downlink from the first wireless network access point to the mobile terminal and the resource allocation relating to the first wireless network access point is a downlink resource allocation for allocation of downlink resources relating to the first wireless network access point and the resource allocation relating to the second wireless network access point is a downlink resource allocation for allocation of downlink resources relating to the second wireless network access point.

27. A mobile terminal for communicating data to or from the mobile terminal, which mobile terminal is configured for dual connectivity wherein the mobile terminal supports two or more contemporaneous links with two or more wireless network access points comprising a first wireless network access point and a second wireless network access point, the mobile terminal comprising
a receiver and a transmitter, and
a processing circuit configured to:
receive, when being in a dual connectivity mode, from the first wireless network access point, respective uplink resource grants for allocation of uplink resources or respective downlink resource allocations for allocation of downlink resources relating to respective ones of the first wireless network access point and the second wireless network access point, wherein the uplink resource grants and downlink resource allocations relating to the first wireless network access point allocate resources for use by the mobile terminal in communicating with the first wireless network access point and the uplink resource grants and downlink resource allocations relating to the second wireless network access point allocate resources for use by the mobile terminal in communicating with the second wireless network access point; and to
transmit uplink data to the first wireless network access point and the second wireless network access point, contemporaneously while the wireless network access points are independent from each other, according to the received respective uplink resource grants, or receive downlink data from the first wireless network access point and the second wireless network access point, contemporaneously while the wireless network access points are independent from each other, according to the received respective downlink resource allocations.

28. The mobile terminal of claim 27, wherein the processing circuit is configured to receive the uplink resource grants or downlink resource allocations relating to the first wireless network access point and the second wireless network access point in a single message, and further being configured to divide resource allocations in the single message between the first wireless network access point and the second wireless network access point according to a predetermined rule for priority of the link between the mobile terminal and the first wireless network access point, relative to the link between the mobile terminal and the second wireless network access point.

* * * * *